United States Patent
Vanhooydonck et al.

(10) Patent No.: US 8,018,634 B2
(45) Date of Patent: Sep. 13, 2011

(54) IMAGE PRINTING METHOD AND SYSTEM FOR IMPROVING IMAGE QUALITY IN DOT MATRIX PRINTER

(75) Inventors: Rudi Vanhooydonck, Zwijndrecht (BE); Robert Janssens, Geel (BE)

(73) Assignee: Agfa Graphics NV, Mortsel (BE)

( * ) Notice: Subject to any disclaimer, the term of this patent is extended or adjusted under 35 U.S.C. 154(b) by 965 days.

(21) Appl. No.: 11/915,294

(22) PCT Filed: May 23, 2006

(86) PCT No.: PCT/EP2006/062529
§ 371 (c)(1),
(2), (4) Date: Nov. 21, 2007

(87) PCT Pub. No.: WO2006/125780
PCT Pub. Date: Nov. 30, 2006

(65) Prior Publication Data
US 2008/0198189 A1    Aug. 21, 2008

Related U.S. Application Data

(60) Provisional application No. 60/690,766, filed on Jun. 15, 2005.

(30) Foreign Application Priority Data

May 25, 2005   (EP) ..................... 05104467

(51) Int. Cl.
*H04N 1/46* (2006.01)
*G06F 15/00* (2006.01)
*B41J 29/38* (2006.01)

(52) U.S. Cl. .................... 358/535; 358/1.9; 347/102
(58) Field of Classification Search .................. 358/501, 358/502, 504, 518, 535, 3.27, 3.32, 1.13, 358/1.18; 347/102, 9, 3, 12, 20, 24
See application file for complete search history.

(56) References Cited

U.S. PATENT DOCUMENTS

| | | | |
|---|---|---|---|
| 4,198,642 A | 4/1980 | Gamblin | |
| 4,967,203 A | 10/1990 | Doan et al. | |
| 5,371,531 A | 12/1994 | Rezanka et al. | |
| 6,092,890 A | 7/2000 | Wen et al. | |
| 6,679,583 B2 | 1/2004 | Vanhooydonck et al. | |
| 6,905,193 B2 * | 6/2005 | Vanhooydonck | 347/41 |
| 6,938,970 B2 * | 9/2005 | Van den Bergen | 347/13 |
| 7,936,479 B2 * | 5/2011 | Bracke et al. | 358/3.03 |
| 2003/0098898 A1 * | 5/2003 | Vanhooydonck et al. | 347/41 |

(Continued)

FOREIGN PATENT DOCUMENTS

EP    1 350 629 A1    10/2003

(Continued)

OTHER PUBLICATIONS

Vanhooydonck et al.; "Image Processing Method and Apparatus for Improving Image Quality in Dot Matrix Printer"; U.S. Appl. No. 11/915,300, filed Nov. 21, 2007.

(Continued)

*Primary Examiner* — Madelein A Nguyen
(74) *Attorney, Agent, or Firm* — Keating & Bennett, LLP

(57) ABSTRACT

Ink coalescence in inkjet printing is reduced by printing mutually interstitial images using an arrangement of multiple curing stations in combination with multiple printing heads.

8 Claims, 17 Drawing Sheets

U.S. PATENT DOCUMENTS

| | | | |
|---|---|---|---|
| 2003/0103100 A1* | 6/2003 | Vanhooydonck et al. | 347/41 |
| 2003/0128252 A1* | 7/2003 | Vanhooydonck et al. | 347/41 |
| 2003/0137555 A1* | 7/2003 | Vanhooydonck et al. | 347/41 |
| 2003/0184633 A1* | 10/2003 | Vanhooydonck | 347/102 |
| 2004/0021732 A1* | 2/2004 | Bergen | 347/41 |
| 2004/0041892 A1 | 3/2004 | Yoneyama et al. | |
| 2004/0233249 A1* | 11/2004 | Vanhooydonck | 347/41 |
| 2009/0051944 A1* | 2/2009 | Bracke et al. | 358/1.9 |

FOREIGN PATENT DOCUMENTS

| | | |
|---|---|---|
| WO | 2004/002746 A1 | 1/2004 |
| WO | 2006/125779 A1 | 11/2006 |

OTHER PUBLICATIONS

Official communication issued in the International Application No. PCT/EP2006/062529, mailed on Sep. 8, 2006.

* cited by examiner

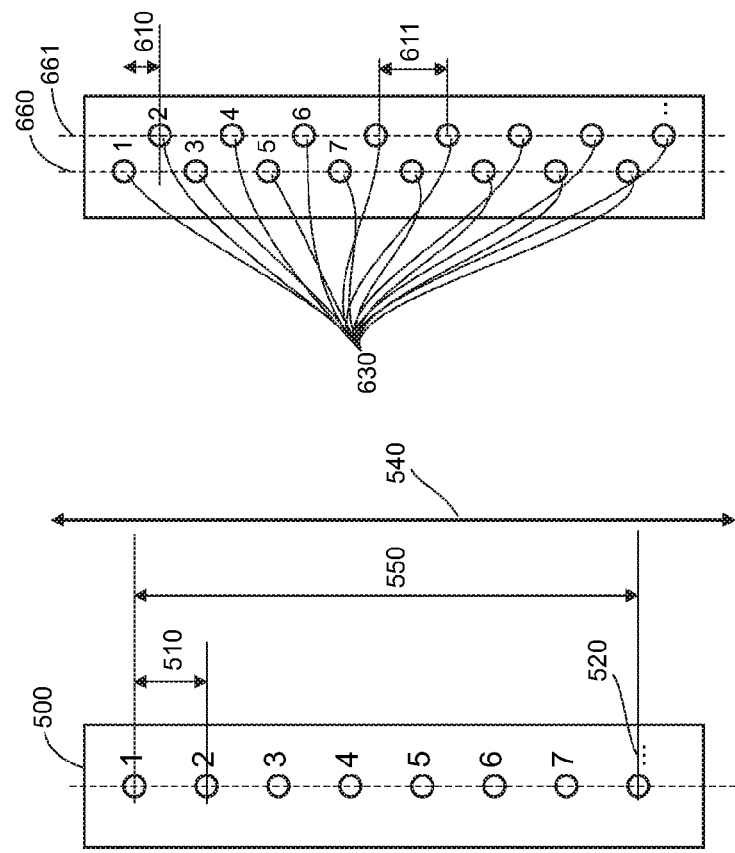
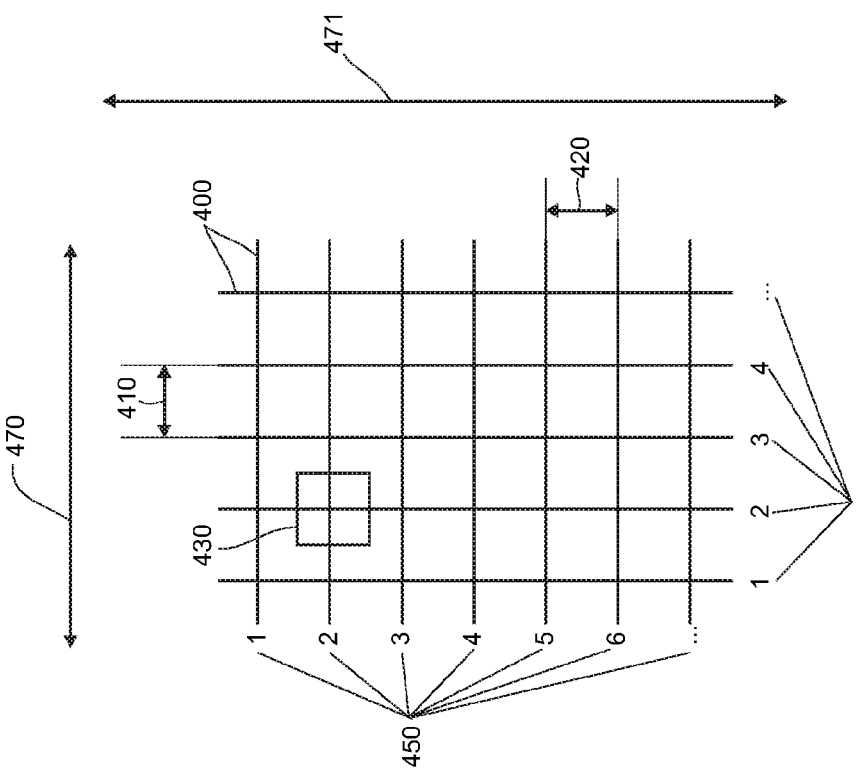
Figure 6
Figure 5
Figure 4

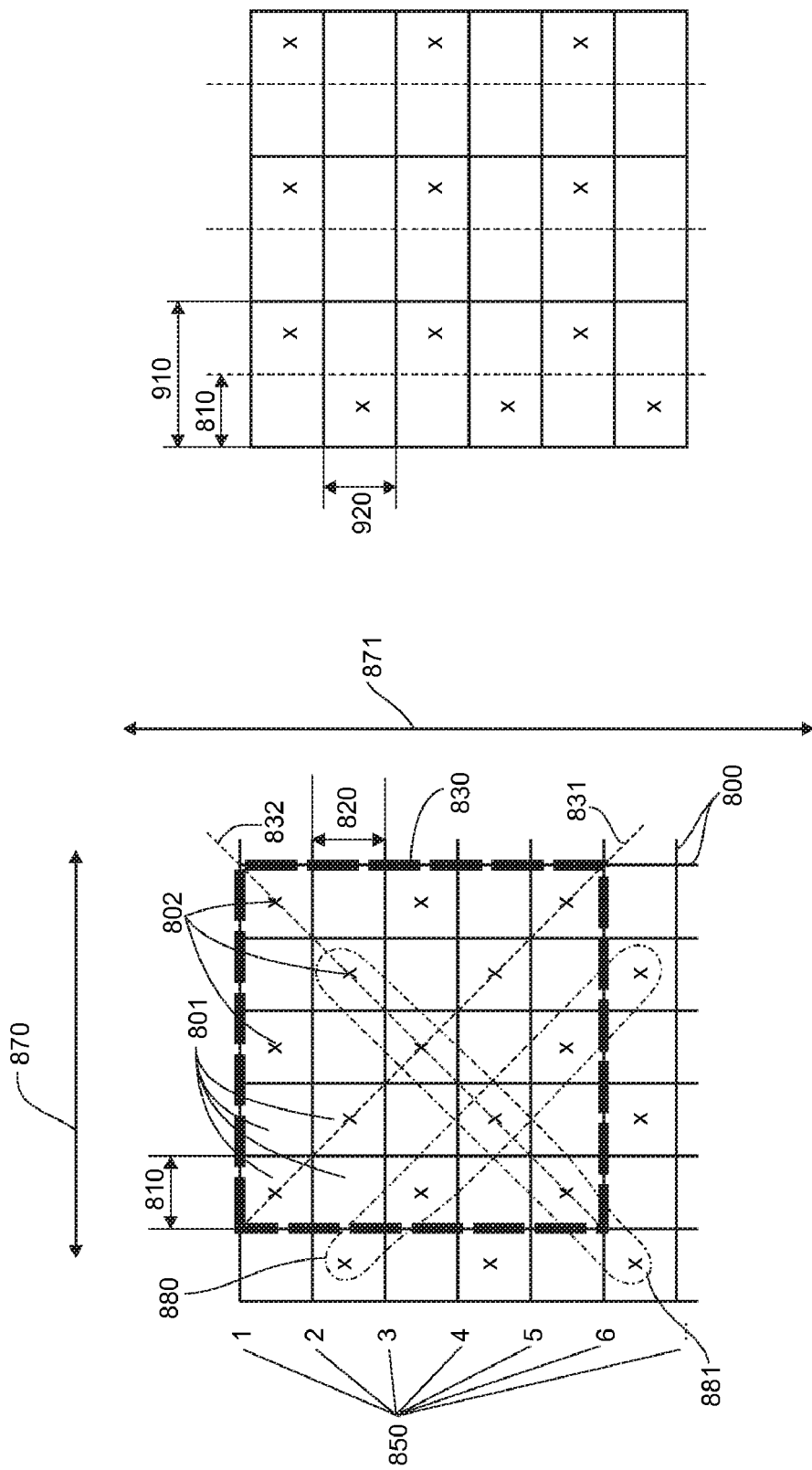

Figure 10B (primary set)

Figure 10C (secondary set)

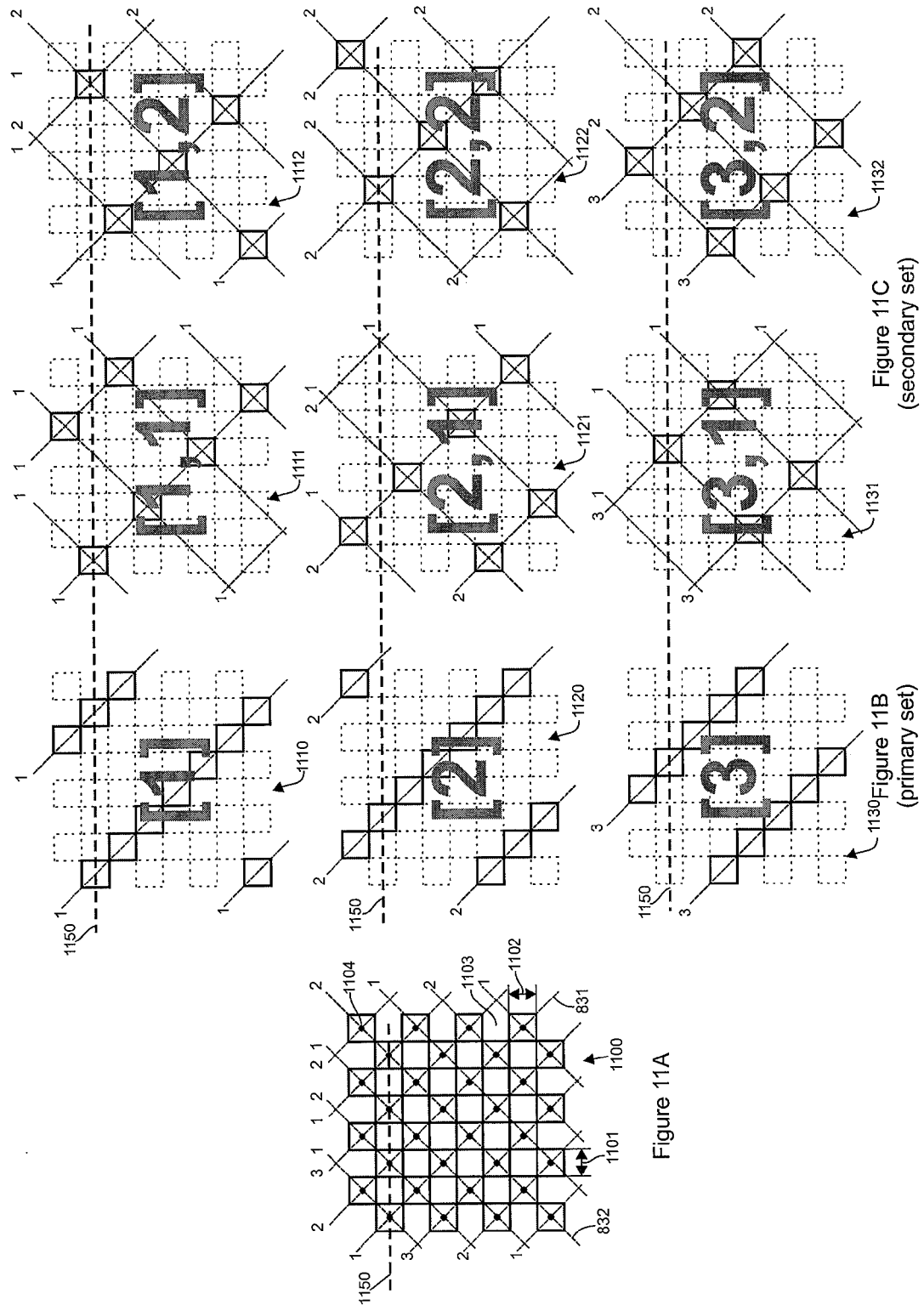

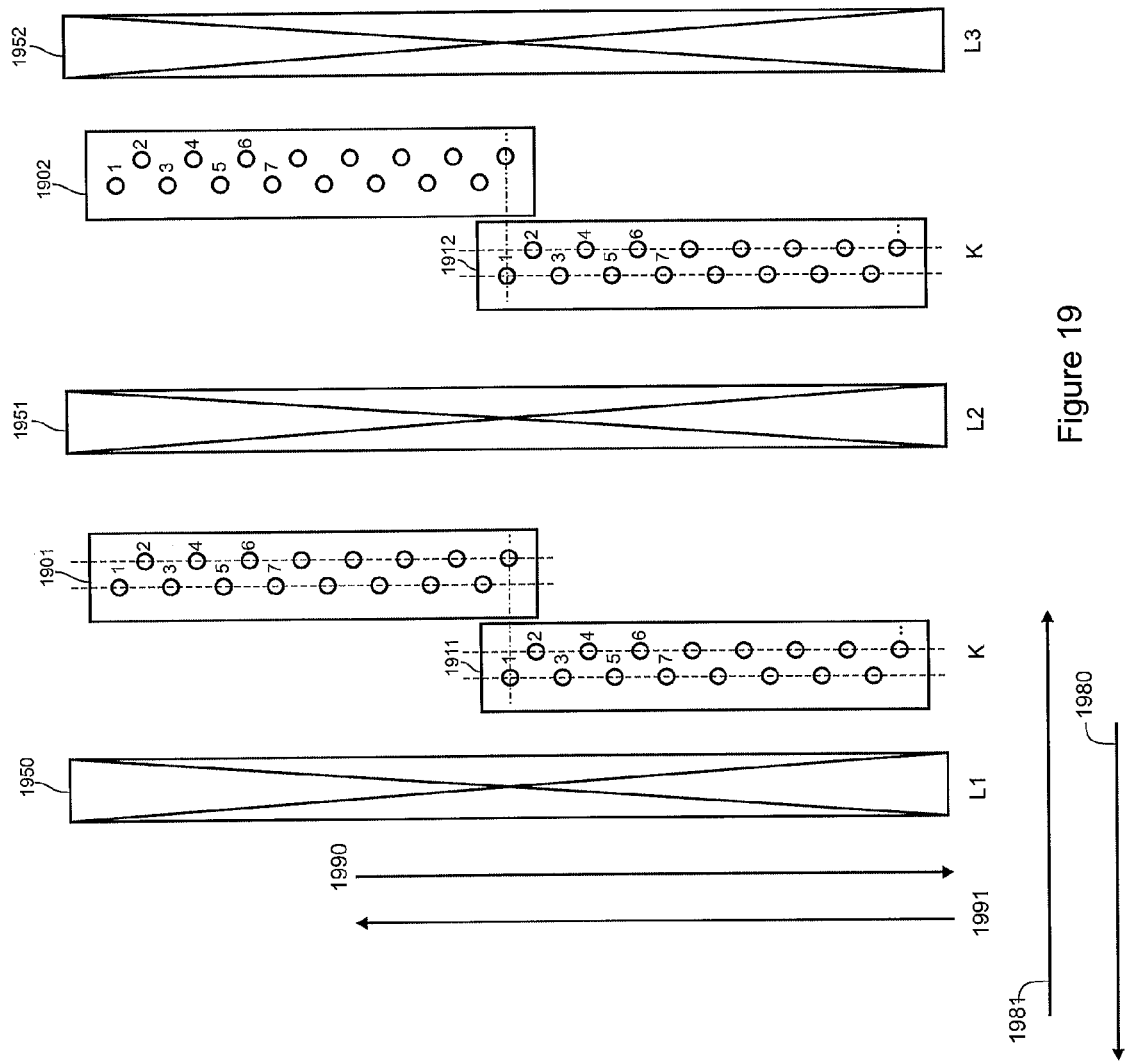

IMAGE PRINTING METHOD AND SYSTEM FOR IMPROVING IMAGE QUALITY IN DOT MATRIX PRINTER

CROSS-REFERENCE TO RELATED APPLICATIONS

This application is a 371 of PCT/EP2006/062529, filed May 23, 2006. This application claims the benefit of U.S. Provisional Application No. 60/690,766, filed Jun. 15, 2005, which is incorporated by reference. In addition, this application claims the benefit of European Application No. 05104467.5, filed May 25, 2005, which is also incorporated by reference.

BACKGROUND OF THE INVENTION

1. Field of the Invention

The present invention relates to an image printing method and system.

More specifically, the present invention relates to a printing method and system for improving image quality in dot matrix printing systems, such as inkjet printers.

More specifically, the present invention relates to a printing method using an arrangement of curing stations and print heads in the context of inkjet printing with UV-curable inks.

2. Description of the Related Art

Printing a digital document is one of the most efficient ways to convey information to a user. New print-on-demand technologies such as laser printing and inkjet printing enable to print documents almost instantaneously without the need for creating intermediate printing masters.

Inkjet printing works by jetting ink droplets through a nozzle onto a substrate.

In the case of a continuous inkjet, a continuous stream of electrically charged ink droplets is produced and electromagnetic fields are used to guide this stream away from or towards a substrate so as to form an image on the substrate.

In the case of a drop-on-demand inkjet, a mechanical or thermal energy pulse is applied to ink residing in a small chamber in order to create a pressure wave that propels a miniscule ink droplet at high speed through the nozzle towards a substrate. The pressure wave is controlled by shaping the length and the profile of the electrical waveform that is applied to the thermal or mechanical transducer in the ink chamber. In many cases, the volume of the droplet and the size of the ink spot are substantially fixed. In other cases, the volume of the droplet can be modulated to create ink spots having different sizes on the substrate.

Printing the image of a document is achieved by moving the nozzle relative to the substrate along a raster by a shuttle in combination with a substrate transport mechanism and selectively jetting ink droplets on the substrate in response to the image of the document.

When the ink droplets land on a substrate, they form ink spots. Because these ink spots are small, they cannot be individually resolved by the human eye but together they render a visual impression of the image of the printed document. Generally, a halftoning technique is used to determine the spatial distribution of ink spots that produces an optimal rendering of the image of a given document.

To increase printing speed, usually not one, but an array of nbrNozzles inkjet nozzles are generally used that can be operated in parallel. Such an array of nozzles makes up a print head.

By moving the shuttle with the print head across the substrate in a fast scan orientation, a set of parallel raster lines of pixels can be printed in one step. Such a set of raster lines is called a swath.

When a swath has been printed, the print head is moved in a slow scan direction over a distance of the length of the array of nozzles to print an additional swath of lines underneath the previous swath. This process of printing swaths is repeated until a complete document is printed on the substrate.

The smallest value for the nozzle pitch is practically limited by constraints imposed by the manufacturing process. For reasons of image quality, however, a printing pitch in the slow scan direction is often desired that is smaller than the nozzle pitch. U.S. Pat. No. 4,198,642 teaches that a value can be selected for the printing pitch in the slow scan orientation that is an integer fraction 1/n of the nozzle pitch by using an interlacing technique.

Because of manufacturing tolerances, systematic variations in the volume of droplets and of both their ejection velocity and direction exist between nozzles belonging to the same inkjet head. If all the ink droplets of a single line of pixels in the fast-scan orientation are printed by the same nozzle, the variations in the ejection direction across the slow-scan orientation show up as correlated image artifacts that look like banding or streaking.

U.S. Pat. No. 4,967,203 introduces a technique to resolve this problem. By having the pixels on one and the same line printed by different nozzles instead of by the same nozzle, the correlated image quality artifacts can be de-correlated. The underlying assumption is that the image quality artifacts caused by variations between different nozzles are uncorrelated. De-correlating the image quality artifacts diffuses them over the printed substrate so that they become less perceptible or preferably imperceptible. In many documents, this technique is referred to as shingling. The method presented in U.S. Pat. No. 4,967,203 uses a staggered application of ink dots such that overlapping ink dots are printed in successive passes of the print head.

In U.S. Pat. No. 6,679,583, an improved technique is presented that combines the effects of the teachings in U.S. Pat. No. 4,198,642 and U.S. Pat. No. 4,967,203 and adds a number of other improvements, including improved printing speed. In this document, the term "mutually interstitial printing" is introduced to describe both interlacing and shingling. The term mutually interstitial printing also avoids confusion, as the term shingling is preferably used in the graphic arts industry to describe a technique that compensates for the effects of the thickness of the paper on the width of the margin in saddle-stitched bookmaking.

Once an ink droplet ejected by a nozzle lands on a substrate, it is cured so that it receives the required resistance against rubbing. Ink curing can be achieved by a number of mechanisms.

A first mechanism of ink curing is absorption of the ink into fibers of the substrate or a porous coating. This is the dominant mechanism when oil or water based inks are used.

A second mechanism of ink curing is coagulation of the ink by evaporation of an ink solvent. When the ink solvent has evaporated, pigments or dyes together with a binder material are left on the paper.

In many practical applications, a combination of the two above effects takes place: ink is initially absorbed by a substrate and then, depending on the vapor pressure of the solvent, evaporates in a shorter or longer time.

A third mechanism of ink curing is polymerization, for example, under the influence of an external energy source such as a UV light source. The high-energy radiation creates free radicals that initiate a polymerization reaction that solidifies the ink. The main advantage of this technique is that it enables the printing on media that do not absorb ink.

A fourth mechanism of ink curing is phase or viscosity change by temperature. Ink is jetted at a high temperature when it is in a liquid phase and solidifies when it cools down on the printed surface.

An objective technical problem exists in inkjet printing when the ink spots from different droplets on the substrate touch each other before they are cured. Because of complex physical effects related to surface tension, the touching ink spots may coalesce. This coalescence results in a mottled appearance of tints that are printed. The effect is most pronounced in tints with a high density, because in these tints, the average distance between the spots is shorter and the risk that neighboring ink spots touch is higher.

The problem of coalescence becomes worse in the case of so-called wet-on-wet printing. Wet-on-wet printing is a technique wherein the droplets from different nozzles land on the same position of the substrate without intermediate curing. A typical example is in color printing where up to four droplets with cyan, magenta, yellow, and black ink printed by different heads mounted on the same shuttle can land on the same pixel position. An advantage of wet-on-wet printing is that the final color of a pixel is not heavily affected by the order of printing the droplets because the inks physically mix before they are cured. This property is particularly advantageous in the case of bidirectional printing, because in bidirectional printing, the order of printing droplets by different heads reverses when the slow scan direction reverses. However, the piling up of droplets on the same position on the substrate also greatly increases the risk for coalescence.

A first solution to the problem of coalescence would be to reduce printing speed. By reducing printing speed, more time is available to cure an ink spot before a neighboring ink spot is printed and this reduces the risk of coalescence.

Reducing the printing speed, however, also increases the waiting time for a printed result and negatively affects the productivity of the inkjet printer, i.e., the economic value that the investment in the printer can create over its lifespan.

Another solution would be to increase the distance between the ink spots by making them smaller or by decreasing the resolution of the addressable grid of printable dot positions. This solution, however, negatively impacts the density that can be achieved when a dot is printed at 100% of the printable dot positions. A comparison between FIGS. 16A and 16B shows that when the ratio of the diameter spotDiameter 720 of an ink spot divided by the shortest distance pixelSize 710 between two printable positions becomes smaller than the square root of 2, areas between the spots are left on the substrate that receive no ink. These areas negatively impact the density of the darkest tint that can be achieved with this system.

Yet another solution would be to change the order of the droplet printing. By printing neighboring pixels at different times, the pixels that are printed first can already be cured before the remaining pixels are filled in. This effect is implicitly achieved when the technique is used as described in U.S. Pat. No. 4,967,203. Because different sets of pixels on the same line are printed during different swaths, there is time to cure a set of pixels printed during an earlier swath before a set of pixels of a later swath are deposited. By spreading the deposition of neighboring ink droplets in time, coalescence is reduced and at the same time, correlated image artifacts are diffused. The method is effective at moderate printing speeds. When higher printing speeds are required, however, the method fails to avoid the occurrence of coalescence.

Yet another solution would be to force the curing of ink droplets when they land on the substrate before additional droplets are printed at nearby pixel positions. This would, for example, be achieved by using a UV curable ink and a UV source that is mounted on the same shuttle and that follows the print head. The patent document U.S. Pat. No. 6,092,890 discloses an apparatus that uses a set of print heads for ejecting UV curable ink droplets in combination with a single UV source associated with the set of print heads for curing the inks by hardening or solidifying the ink drops on the receiver. This improves the problem of coalescence but introduces another problem. Hardening the ink drops on the receiver immediately after they are printed results in a surface that becomes microscopically "bumped" in an image-wise fashion. Another effect is that when an ink droplet during a subsequent pass lands at or near a cured ink spot, it tends to spread in a completely different way than when the same droplet would land on a wet droplet or on an unprinted substrate. The result is an image with an uneven gloss and texture. What is really needed is a system that results in even gloss and smooth texture of a printed document. Another problem with the disclosure in the U.S. Pat. No. 6,092,890 is that it provides no clear explanation of the printing method itself. It is not clear, for example, whether in one pass of the print heads one or more inks are deposited at the same time or not. Furthermore, since only a single UV source is used, the apparatus is designed to print only in one direction along the fast scan orientation, which lowers the maximum achievable printing performance compared to systems that support bidirectional printing.

WO 2004/002746 describes a method and an apparatus and introduces the concept of a first "partial curing" step by a first UV source followed by a "final curing" step by a second UV source. The image is reconstructed by printing series of mutually interstitial images with intermediate curing. The partial curing of each mutually interstitial image immediately after printing enables to control the coalescence of ink without substantially compromising the smoothness of the gloss and texture of the final printed surface. Because the method and the apparatus in the document WO 2004/002746 use only one UV lamp for the intermediate curing, they are designed for printing only in one direction along the fast scan orientation, which limits the maximum achievable printing performance compared to systems that support bidirectional printing.

Bidirectional printing has been described in the prior art, however, not in the context of printing techniques that use intermediate curing. Many technical problems that involve the management of printing and curing, the lay out of an apparatus for such purpose, and the required image processing to suppress correlated image artifacts and to achieve a smooth and even gloss and texture of the printed result hence remain unresolved.

In view of the state of the art, an improved and alternative method and apparatus are needed for dot matrix printing that suppresses coalescence, support the printing with UV curable inks, optimizes printing performance, supports bidirectional printing, suppresses correlated image artifacts, and results in an even gloss and smooth texture of the printed result.

SUMMARY OF THE INVENTION

The above-mentioned advantageous effects are realized by a method and a system having the specific features set out in the preferred embodiments described below.

By sub-sampling an original image according to a checkerboard pattern, halftoning the sub-sampled image, separating the halftoned sub-sampled image into sub-images along a diagonal orientation, and printing on a given line first all the pixels belonging to a first sub-image, before printing on the line pixels belonging to another sub-image, coalescence is effectively suppressed.

By using an arrangement of multiple printing heads and multiple curing stations that enable the printing of multiple sub-images in one single pass along a fast scan direction, printing speed is increased.

Other features, elements, processes, steps, characteristics and advantages of the present invention will become more apparent from the following detailed description of preferred embodiments of the present invention with reference to the attached drawing.

BRIEF DESCRIPTION OF THE DRAWINGS

FIG. 4 shows an addressable print grid having pixels and characterized by a slow scan pitch and a fast scan pitch.

FIG. 5 shows a dot matrix print head having multiple nozzles.

FIG. 6 shows a print head having multiple nozzles that are organized in two staggered columns of nozzles.

FIG. 8 shows a preferred embodiment of the current invention wherein an image is sub-sampled.

FIG. 9 shows a preferred embodiment of the current invention in which a sub-sampled image that has been derived from an original image having a resolution in the fast scan orientation that is half the resolution in the slow scan orientation of the addressable printer grid.

FIGS. 10A, 10B, and 10C show a preferred embodiment of the current invention, in which a sub-sampled image is separated in a primary series of two sub-images, with each one of the sub-images being separated into a secondary series of two sub-images.

FIGS. 11A, 11B, and 11C show a preferred embodiment of the current invention, in which a sub-sampled image is separated in a primary series of three sub-images, with each one of the sub-images being separated a secondary series of two sub-images.

FIG. 19 shows a print head assembly having multiple sets of print heads and multiple curing sources.

DETAILED DESCRIPTION OF PREFERRED EMBODIMENTS

Description of the Apparatus
Printing

Figure 1:
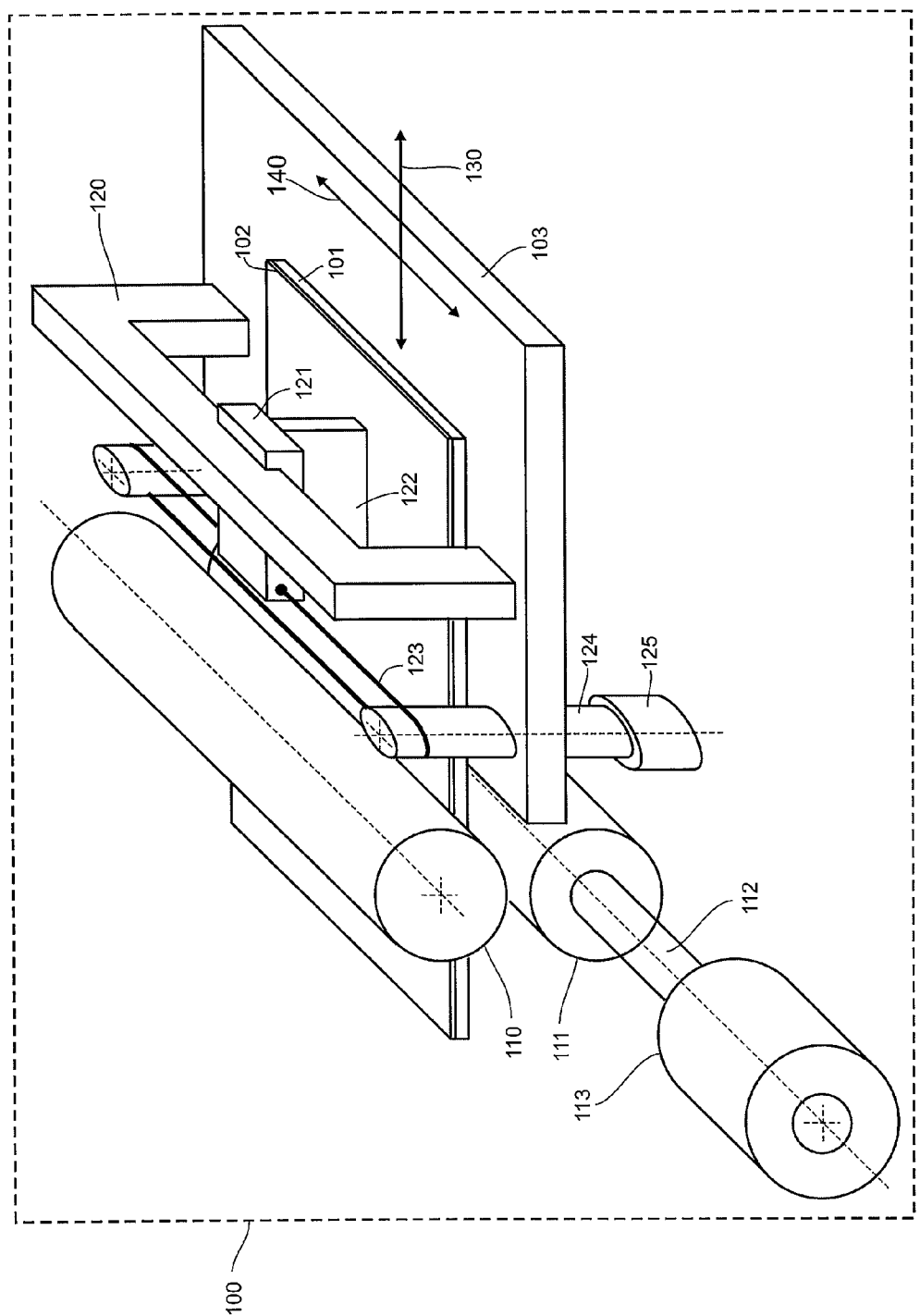
FIG. 1 shows a dot matrix printer according to a preferred embodiment of the current invention.

A preferred method according to the current invention is mainly directed towards the use in dot matrix printers and specifically drop-on-demand inkjet printers, but it is not limited thereto. The term printing as used in the present invention refers to the process of creating a structured pattern of ink markings on a substrate. Non-impact printing methods are preferred but the present invention is not limited thereto.
Ink The ink could be a conventional pigmented or dyed ink or colorant, but it could also be wax, a water repellent substance, an adhesive, or a plastic. Usually, ink is not a pure compound, but a complex mixture including several components such as dyes, pigments, surfactants, binders, fillers, solvents, water, and dispersants, each component serving a specific function. The ink could also be a material of which the viscosity or phase changes with temperature, such as wax. Specifically mentioned also are inks that polymerize, for example, under the influence of electromagnetic radiation such as UV light. This process is called curing.
Substrate The substrate could be paper, but it could also be a textile, a synthetic foil, or a metal plate. Examples of printing processes include inkjet printing (drop-on-demand and continuous), thermal wax or dye transfer printing, and the use of an inkjet to create printing masters for offset printing.
Print Head and Shuttle Transport Referring to a specific preferred embodiment shown in FIG. 1, a transducer, an ink chamber, and a nozzle (etched in a nozzle plate) together make up a print head 122. Such a print head 122 is mounted on a shuttle 121 that is capable of travelling on a guide 120. The shuttle transport is achieved by a belt 123, a shaft 124, and a first motor 125.
Substrate Transport In the same preferred embodiment, a substrate 101 having an ink receiving layer 102 rests on a substrate support 103 and is transported by a substrate transport mechanism including two rollers 110, 111, a shaft 112, and a second motor 113.
Printing Revisited Printing an image of a document using a printer 100 is generally achieved by moving a nozzle relative to a substrate by the shuttle and substrate transport mechanisms and selectively jetting ink droplets on the substrate in response to the image of the document.
Fast Scan and Slow Scan Orientation and Direction The orientation that corresponds with the movement of a shuttle along its guide is generally called the fast scan orientation 140. The fast scan direction shall mean the direction that the shuttle moves along the fast scan orientation. The orientation perpendicular to the fast scan orientation is generally called the slow scan orientation 130. The slow scan direction shall mean the direction that a print head moves along the slow scan orientation relative to the substrate.

A raster line shall mean a virtual line on which ink droplets are printed by a nozzle along a fast scan orientation.

Bidirectional Printing

In order to reduce idle time of the nozzle when the shuttle returns, printing is preferably done bidirectionally, i.e., printing occurs in the two directions corresponding to the fast scan orientation.

Addressable Grid of Pixels

Referring to FIG. 4, the rectangular raster grid that is defined by the positions where a droplet can be printed is called the addressable grid 400. An element of the addressable grid is a pixel 430. The pixels are arranged in rows addressed by a slow scan index 450 and columns addressed by a fast scan index 460. With one pixel is associated a color or a set of colorant values. The color can be monochrome or full color (three color components, for example, expressed as the amounts of red, green, and blue primaries). The set of colorant values can, for example, be amounts or densities of cyan, magenta, yellow, and black colorants.

The distance between two neighboring pixels along the fast scan orientation 470 is called the fast scan pitch fastScanPitch 410, while the distance between two neighboring pixels along the slow scan direction 471 is called the slow scan pitch slowScanPitch 420.

A relation exists between the pitch in the fast and slow scan orientation and the spatial resolution of a printer.

The fast scan pitch fastScanPitch and the fast scan printing resolution fastScanResolution are related to each other by an inverse relationship:

fastScanResolution=1/fastScanPitch.

The same is true for the relation between the slowScanResolution and the slowScanPitch:

slowScanResolution=1/slowScanPitch.

A smaller pitch (or a higher spatial resolution) enables the rendering of finer image details and hence in general enables to achieve a higher image quality.

For a constant speed fastScanVelocity of the print head in the fast scan direction, the printing resolution fastScanResolution is proportional with the firing frequency firingFrequency of the nozzles, i.e., the time rate at which ink droplets can be ejected by a nozzle. Hence the fast scan resolution fastScanResolution is dictated by the ratio of the firing frequency firingFrequency divided by the velocity fastScanVelocity in the fast scan direction:

fastScanResolution=firingFrequency/fastScanVelocity

Array of Nozzles

Referring to a preferred embodiment shown in FIG. 5, not one, but an array 500 of inkjet nozzles nbrNozzles 520 can be used that operate in parallel and that produce droplets with either a fixed or a variable volume.

Each nozzle can be referred to by a nozzle index nozzleindex that ranges from 1 to nbrNozzles. In general, the nozzle array 500 is oriented parallel to the slow scan orientation 540 although this is not a strict requirement. The shortest distance between two nozzles along the slow scan orientation 540 is called the nozzle pitch nozzlepitch 510. The length of the nozzle array headLength 550 is expressed as a multiple of the length of slowScanPitch. A set of rows of pixels on the addressable grid that can be addressed by the nozzles of a print head during one movement along the fast scan orientation is called a swath.

Referring to FIG. 6, the nozzles 630 of an array may be staggered for constructive reasons along two or more columns 660, 661. In that case, the nozzle pitch 610 is defined as the shortest distance between two lines perpendicular to the slow scan orientation through the centers of the staggered nozzles. In the case of staggered arrays of nozzles, the timing of the firing of droplets from nozzles belonging to different columns is preferably adjusted so that the pixels belonging to the same column in the image of the document also land on the same column on the printed image. By adjusting the timing this way, the processing to prepare the signals for the nozzles can be the same as if all the nozzles were virtually on the same column.

According to a preferred embodiment, two staggered columns are used each having 382 nozzles. According to the same preferred embodiment, the distance 611 between two nozzles in one column is 141 micrometers (1/180 inch) and the nozzle pitch 610 is 70.6 micrometers (1/360 inch).

According to a preferred embodiment, the printing resolution in the slow scan orientation is increased by using one of the interlacing techniques known in the art. Specifically, the resolution in the slow scan orientation can be doubled by using a slow scan interstitial factor equal to two. This brings the slow scan pitch to a value of 35.3 micrometers (1/720 inch). According to a preferred embodiment, the value of fastScanVelocity is adjusted so that value of the fast scan pitch is equal to that of the slow scan pitch.

According to a preferred embodiment of the current invention, not one, but a set of print heads are used that print with different inks. In general, the inks have different hues but in a preferred embodiment, they have the same hue but different densities, such as, for example, a light and dark cyan, or a light and dark neutral color. In a preferred embodiment, a set of four print heads are used to print with four inks having cyan (C), magenta (M), yellow (Y), and black (K) colors. In a preferred embodiment, these inks are curable by electromagnetic radiation such as UV light.

The different print heads can be mounted near or below each other, or in a staggered fashion relative to each other. According to a preferred embodiment, the values of the nozzle pitch of the different print heads are the same and the heads are mounted in such a way that the nozzles are spaced at an integer multiple of the slow scan pitch along the slow scan orientation. The timing of the firing of the droplets belonging to different print heads is preferably adjusted so that the droplets that belong to the same column in the image also land on the same column on the printed image.

Because the droplets from the different print heads that land on the same pixel position are printed during the same swath, little time passes between the printings of these droplets. This implies that the ink spots from the different droplets can physically mix. This technique of jetting subsequent droplets without intermediate curing is called wet-on-wet printing.

Figure 7:
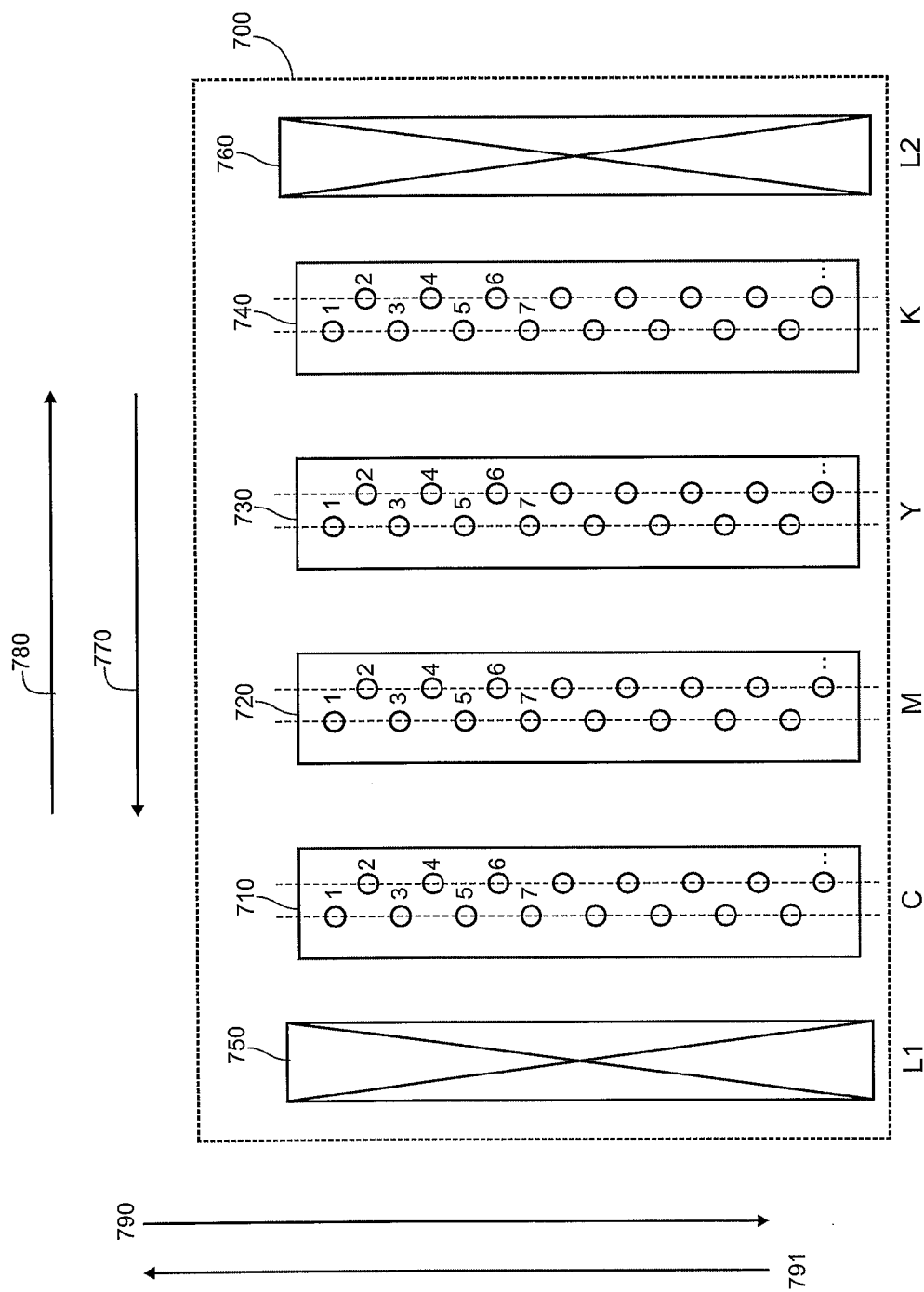
FIG. 7 shows a print head assembly having four print heads and two curing sources.

According to a preferred embodiment, FIG. 7 also shows two optional curing sources L1 750 and L2 760. These sources are designed to boost the curing of the ink. An example could be the use of a UV curable ink in combination with UV lamps that enhance polymerization of the ink. Another example could be an IR source that enhances drying of the ink. According to a preferred embodiment, the output power of the sources can be controlled by the printer controller, for example by controlling the amplitude or the duty cycle of the current passing through the lamps or by controlling the number of lamps in the same source that are simultaneously powered.

The print heads 710, 720, 730, 740 and the curing sources 750, 760 together make up a print head assembly 700.

Figure 17:
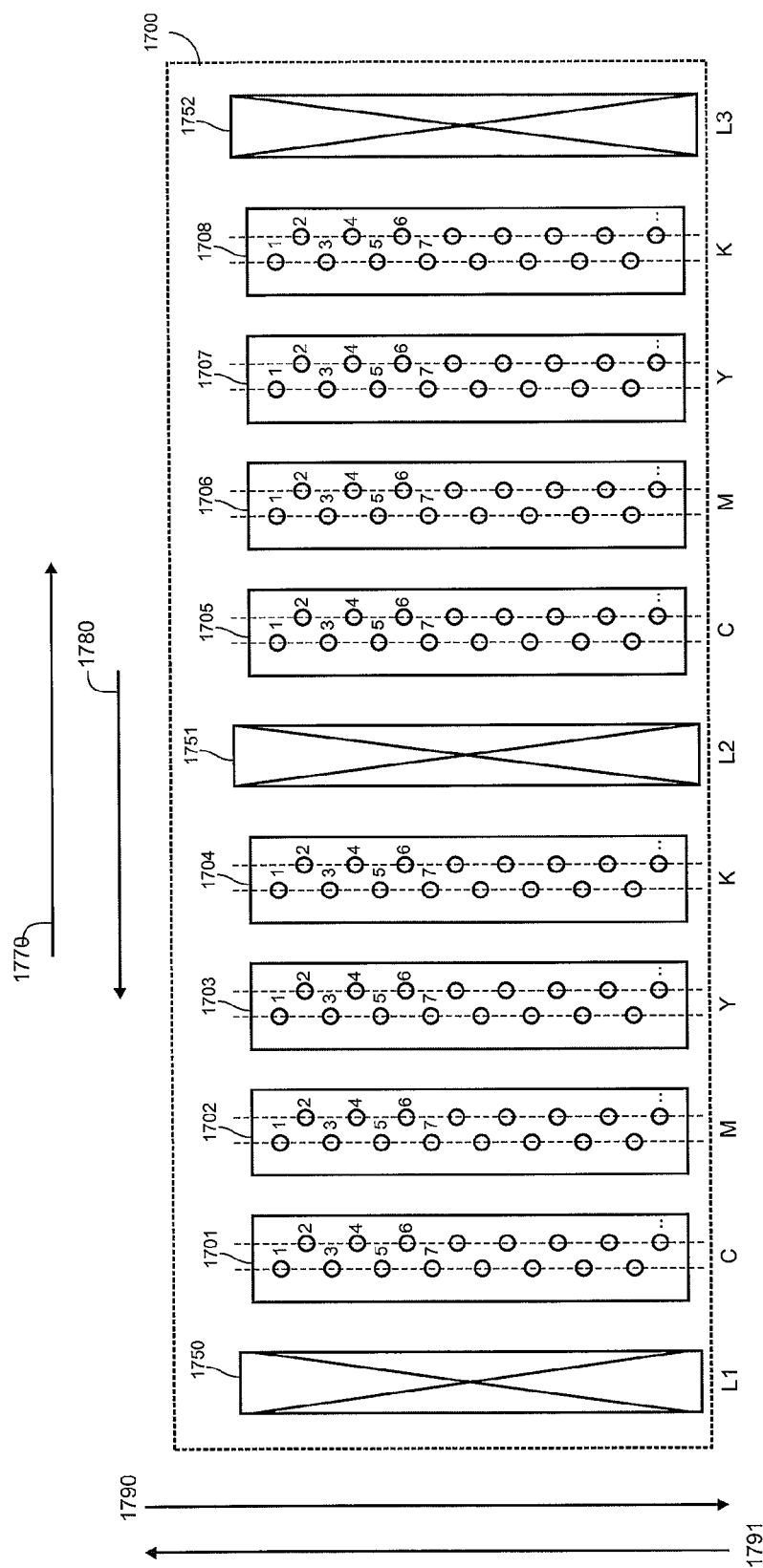
FIG. 17 shows a print head assembly having two sets four print heads and three curing sources.

According to a preferred embodiment shown in FIG. 17, multiple curing sources L1 1750, L2 1751, and L3 1752 are used. In between the sources L1 1750 and L2 1751 a first set of print heads 1701-1704 is provided and between the sources L2 1751 and L3 1753 a second set of print heads 1705-1708 is provided. The light sources L1 1750, L2 1751, and L3 1752 and the print heads 1701-1708 together make up a print head assembly 1700.

According to the present preferred embodiment and still referring to FIG. 17, the nozzles of all the heads are shifted along a slow scan orientation 1790, 1791 axis so that nozzles belonging to different heads 1702, 1703 but having the same nozzle index print on the same raster line during the same swath. According to another preferred embodiment, the nozzles of all of at least two heads 1703, 1704 are shifted along a slow scan orientation 1790, 1791 axis so that nozzles belonging to different heads 1703, 1704 but having the same nozzle index print on a different raster line during the same swath.

The preferred embodiment shown in FIG. 17 includes twice the number of heads compared to the arrangement shown in FIG. 7 and therefore enables to achieve faster printing speed. If printing performance needs to be further enhanced, more curing sources and more print heads can be mounted along the fast scan orientation 1770, 1780.

According to the present preferred embodiment and still referring to FIG. 17, the output power of the sources is controlled by a printer controller, for example, by controlling the amplitude or the duty cycle of the current passing through the lamps or by controlling the number of lamps in the same source that are simultaneously powered.

FIG. 19 shows a preferred embodiment featuring multiple curing stations 1950, 1951, 1952; multiple heads 1901, 1902 along a fast scan orientation 1980, 1981; and multiple heads 1911, 1912 along a slow scan orientation 1990, 1991. According to the present preferred embodiment in FIG. 19, the heads 1901, 1911 are staggered. By adjusting the timing of the drivers of the staggered print heads so that a single contiguous line of pixels in the halftone image that is parallel to the slow scan orientation is also printed as a single contiguous line, the staggered print heads effectively behave as one long single print head. Using plural heads 1901, 1911 along a slow scan orientation increases the number of nozzles that can print simultaneously during a swath and therefore increases printing performance.

Unfortunately, a staggered arrangement of print heads results in an increased size of the print head assembly along a fast scan orientation 1980, 1981 and correspondingly an increased weight. This increased weight results in increased acceleration and deceleration forces when the print head assembly switches direction in the fast scan orientation and therefore complicates the mechanical design.

Figure 18:
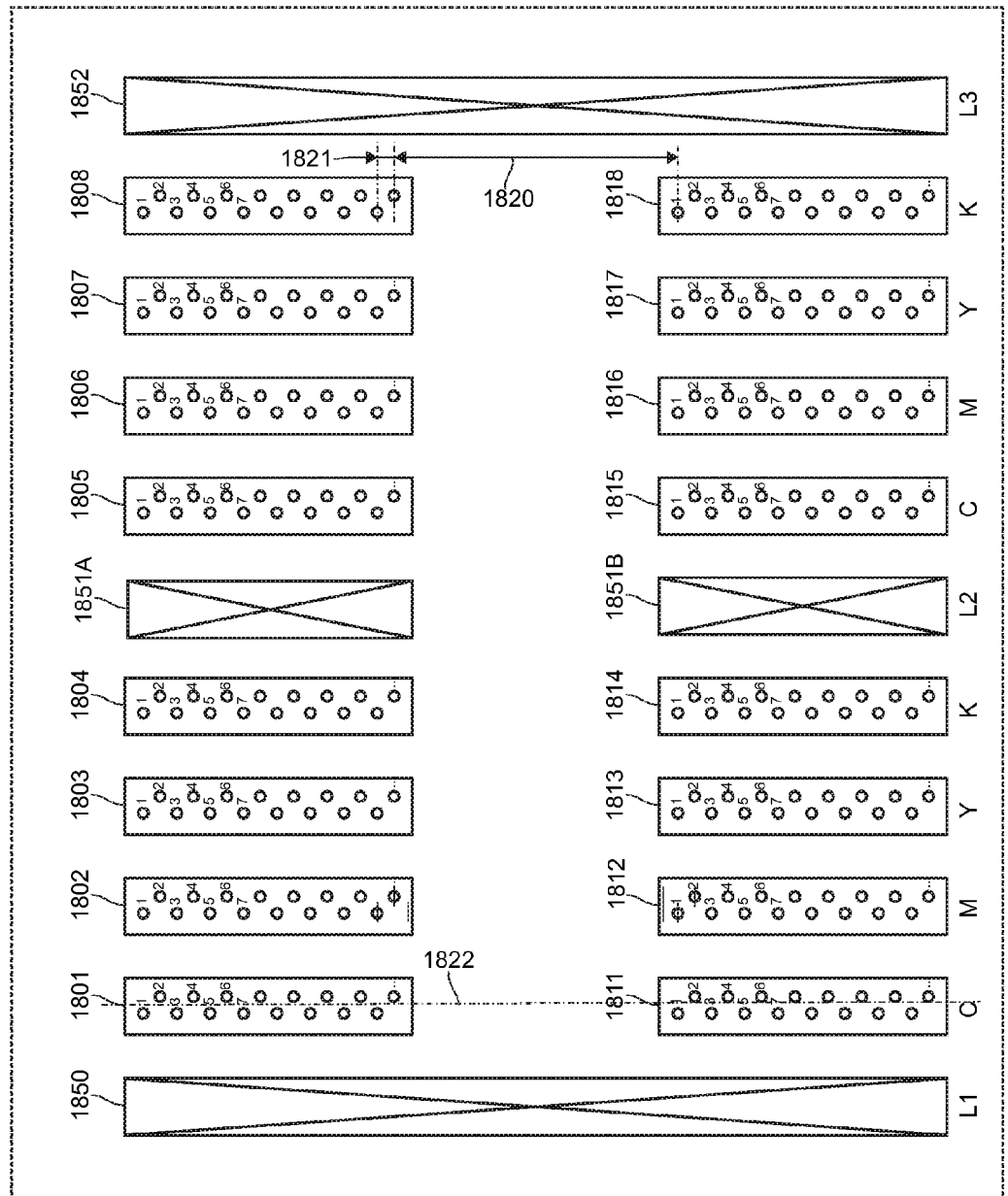
FIG. 18 shows a print head assembly having multiple sets of print heads and multiple curing sources.

Therefore, according to another preferred embodiment shown in FIG. 18, the multiple print heads 1801, 1811 are essentially lined up along a line 1822 parallel to the slow scan orientation. Preferably, the print heads 1808, 1818 are mounted at a distance relative to each other so that a distance 1820 between two nozzles belonging to different heads 1808, 1818 is a multiple of the slow scan pitch 1821. An advantage of this preferred embodiment is that the total size of the print head assembly along a fast scan orientation and the corresponding weight of such a unit can be minimized.

A disadvantage is that in the arrangement shown in FIG. 18, a gap 1820 exists between the two heads 1808, 1818 where no printing occurs. This technical problem is resolved using image processing.

In a preferred embodiment of the current invention, the distance 1820 between two print heads 1808, 1818 is nbrNozzles times the nozzlePitch 1821. In another preferred embodiment of the current invention, the distance 1820 between two print heads 1808, 1818 is smaller than nbrNozzles times nozzlePitch but equal to a multiple of the nozzlePitch 1821. In the remainder of the text, the term gapSize is used to refer to the distance 1820.

In a preferred embodiment, at least one of the curing stations 1851 is split into two curing stations 1851A, 1851B.

Computer System

Figure 3:
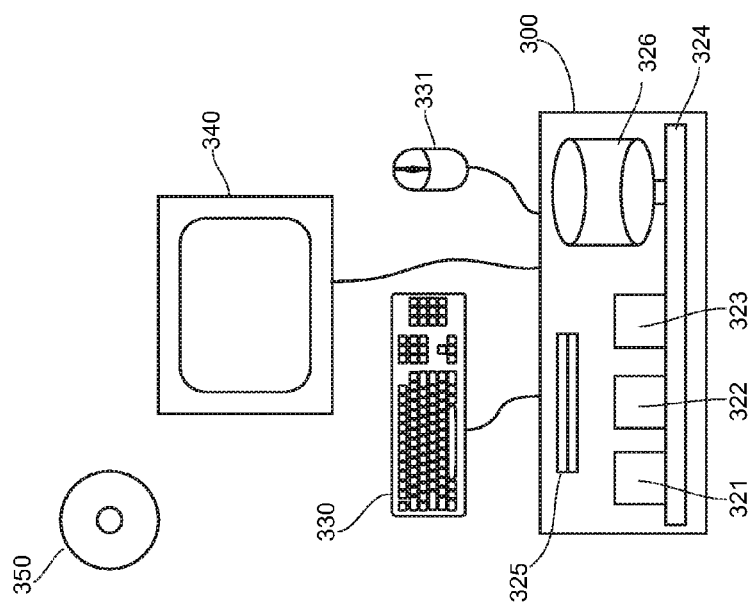
FIG. 3 shows a data processing system to drive a printer controller.

According to another preferred embodiment and referring to FIG. 3, printer commands are generated from a data processing system 300, such as a computer. The computer includes a network connection 321, a central processing unit 322, and a memory 323 which are all connected through a computer bus 324. The computer typically also has a computer human interface 330, 331 for inputting data and a computer human interface 340 for outputting data. According to a preferred embodiment, the computer program code is stored on a computer readable medium such as a mass storage device 326 or a portable data carrier 350 which is read by a portable data carrier reader 325.

Printer Controller

Figure 2:
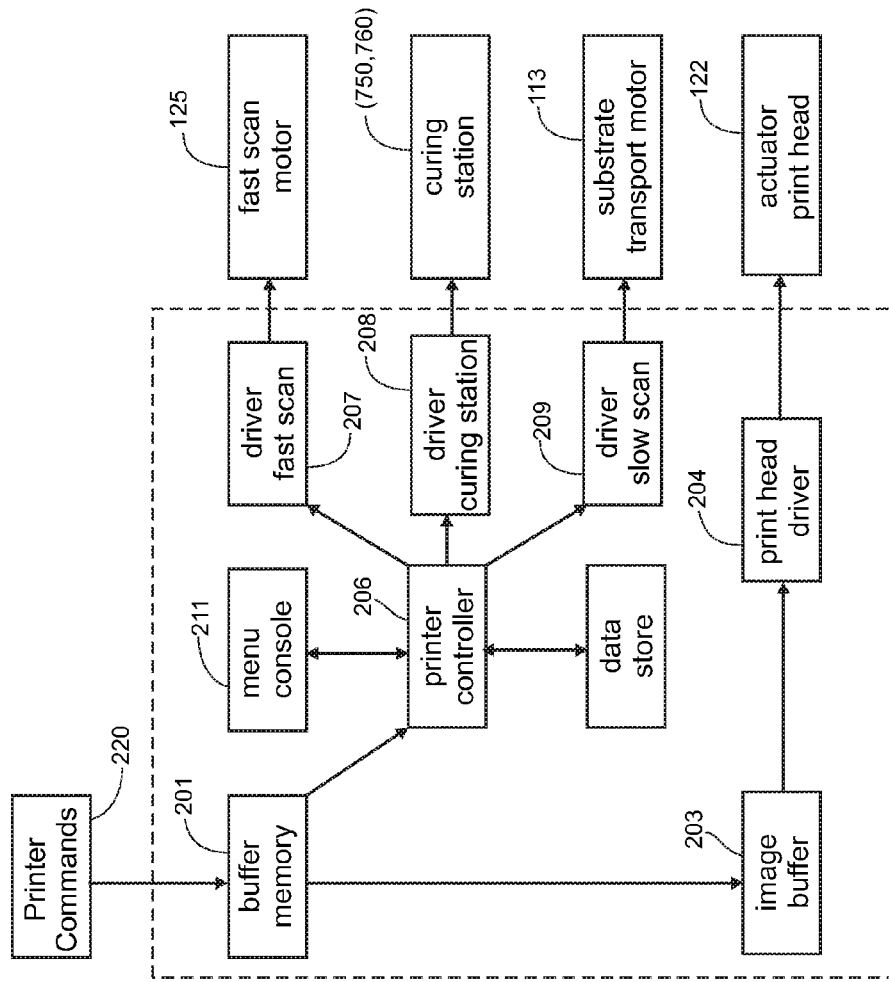
FIG. 2 shows a diagram of a printer controller.

Referring to FIG. 2, the fast scan motor 125, the slow scan motor 113, and the actuator of the print head 122 are controlled by a printer controller 200. Printer commands 220 are received by a buffer memory 201. These printer commands contain printer controller information which is sent to a printer controller 206 and image data which is sent to an image buffer 203. The printer controller controls a fast scan driver 207 that drives the fast scan motor 125 for moving the shuttle in a fast scan direction. The printer controller also controls a slow scan driver 209 that drives the slow scan motor 113. In case the printer also has a curing station, as in a preferred embodiment, the controller also includes a driver 208 for the curing station 750, 760. The information in the image buffer 203 is used to drive the actuator(s) of the print head 122 by a print head driver 204.

Description of the Method

Raster Image Processing

According to a preferred embodiment, a first step of printing the image of a document includes calculating a continuous tone raster image of the document at the printer's spatial resolution and in the printer's colorant space.

This process involves the transformation of a document, usually represented at the object level in one of the standardized formats such as PDF®, MS-Word®, or PostScript®, into a continuous tone raster image.

Such a continuous tone raster image contains for every addressable position of the printer grid a pixel value representing on a near-continuous tone scale the amount of ink that belongs to that pixel position.

According to a preferred embodiment, the calculations are done on the computer system 300 by a computer program such as "Adobe PostScript Printer Driver" commercialized by the company Adobe Systems Incorporated, located in San Jose, Calif.

Sub-Sampling

According to a preferred embodiment, a second step includes sub-sampling the continuous tone image.

This process is explained with reference to FIG. 8. Every square 801 corresponds with a pixel at the full printer resolution. The fast scan pitch fastScanPitch 810 and slow scan pitch slowScanPitch 820 are, in this particular example, identical. The sub-sampling consists of retaining pixel values only at the positions indicated with an x-mark 802. The pixels in the resulting sub-sampled image are spatially laid out on a grid that, in this case, is 45 degrees rotated with regard to the addressable grid of the printer and form a checkerboard pattern and that contains half of the pixels as the original image.

In a more general situation, the positions 802 of the pixels in the sub-sampled image are defined by first identifying two diagonal orientations that correspond with the diagonal lines of any rectangular cell 830 on the addressable grid 800 that contains the same number of pixels NP (NP>1) in the fast and slow scan orientations. In the remainder of the text, the orientations of the two diagonal lines are referred to as a first diagonal orientation 831 and a second diagonal orientation 832.

The sub-sampled image is then defined as the set of one out of every two pixels 801 on every row 850 of the addressable printer grid 800, arranged in such a way that they form contiguous series 880, 881 of pixels 802 along the two diagonal orientations 831, 832.

Sub-sampling techniques, often referred to as decimation techniques, are known to the person skilled in the art.

According to a preferred embodiment, sub-sampling is performed by simply selecting the pixel values in the continuous tone raster image that correspond with the position of pixels in the sub-sampled image.

According to another preferred embodiment, first a low pass filter is applied on the continuous tone raster image, after which the pixel values are selected in the filtered image that correspond with the positions in the sub-sampled image.

Digital Halftoning

Because the tonal resolution of the pixel values in the continuous tone raster image is higher than the tonal resolution of the printer, a third, digital halftoning step is required according to a preferred embodiment. For example, the pixels in the continuous tone raster image or the sub-sampled image may be represented with 8 bits per colorant component, while the printer may only be able to print four distinct tone levels represented by 2 bits per colorant component. The task of the digital halftoning step is spatially diffusing the image artifacts that result from the quantization of the pixels from eight to two bits per color component. The result of halftoning a sub-sampled continuous tone raster image is a halftoned sub-sampled image. Digital halftoning techniques have been known to the person skilled in the art. Examples include error diffusion or threshold mask based frequency modulation techniques.

Preferred Embodiments for Steps 1-3

According to preferred embodiments, the steps of calculating a continuous tone raster image of the document, sub-sampling the image, and halftoning the sub-sampled image can be optimized for performance and memory usage. According to FIG. 9, the continuous tone raster image is first calculated at half the printer resolution in the fast scan orientation and at the full printer resolution in the slow scan orientation. FIG. 9 shows that the pitch 910 of the continuous tone raster image in the fast scan direction is two times larger than the pitch 810 of the addressable grid of the printer. This continuous tone image can be halftoned using one of the techniques known by the person skilled in the art such as error diffusion or a threshold mask based frequency modulation technique. In a next step, the pixels of the halftoned image are mapped to the pixels of the addressable grid of the printer at the positions indicated with an x-mark in FIG. 9. This mapping is achieved by using the following rule set that maps a pixel of the halftoned image having row index [i] and column index [j] onto a pixel of the addressable printer grid having row index [k] and column index [l]:

```
if [i] is odd
    than k=i and l=2*j+1;
else
    k=i and l=2*j;
```

An equivalent variation of the rule is:

```
if [i] is even
    than k=i and l=2*j+1;
else
    k=i and l=2*j;
```

It should be clear to the person skilled in the art that an equivalent alternative consists of starting from a continuous tone image at half the printer resolution in the slow scan direction and at the full resolution in the fast scan direction.

The above combined approach for raster image processing, sub-sampling, and halftoning is particularly efficient, as it requires the calculation of a continuous tone raster image having only half the number of pixels compared to the full resolution raster image and does not involve sophisticated decimation techniques. In addition, standard halftoning techniques that are developed to operate on a rectangular pixel grid can be used to convert the continuous tone image into a halftone image.

Separation into Sub-Images

In a fourth step according to a preferred embodiment of the current invention, the halftoned image is separated into mutually interstitial sub-images.

This is preferably done in two sub-steps, which are demonstrated in FIGS. 11A-11C.

In a first sub-step, the halftoned sub-sampled image is separated into a primary set of M (M>1) mutually interstitial sub-images along a first diagonal orientation.

FIG. 11A shows the addressable pixel 1103 grid of the printer having a fast scan pitch 1101 and slow scan pitch 1102. The positions of the halftoned pixels of the sub-sampled image are indicated by a black dot 1104. The figure also shows a first 831 and a second 832 diagonal orientation.

Separating an original image into mutually interstitial sub-images shall mean that every pixel as a whole (including all of its color components) in the original image 1100 is selectively assigned to one of several sub-images having the same size and resolution as the original image in a way that, when the sub-images are added together, the original image is reconstructed.

Separating an image into sub-images along an orientation shall mean that a set 880, 881 of subsequent pixels 802 in an original image that lie on a line that is parallel to the orientation 831, 832 shall be assigned to the same sub-image.

In view of the above definitions, the drawings in FIG. 11B can now be interpreted. In this particular case M equals three. The halftoned sub-sampled image 1100 is separated into three mutually interstitial images 1110, 1120, 1130 along a first diagonal orientation 831.

In a secondary sub-step, the sub-images 1110, 1120, 1130 obtained in the primary sub-step are further separated into a secondary set of N (N>=1) mutually interstitial images along a second diagonal orientation 832.

The drawings in FIG. 11C, for example, show that the separated image 1110 is further separated into sub-images 1111, 1112 along a second diagonal orientation 832.

The effect of combining the first and the second sub-steps of step 4 is that a total of M*N sub-images are obtained. These sub-images can be indexed by means of a two-dimensional index [i,j].

For example, a first index i, (1<i<=M) can refer to the index of the sub-image after the first separation sub-step. The second index j (1<=k<=N) can refer to the index of the sub-image after the second separation sub-step. Referring to the example in FIGS. 11A-11C, six sub-images are obtained having indices [1,1], [1,2], [2,1], [2,2], [3,1] and [3,2].

In the special case that N=1, the second sub-step can be skipped.

Preferred Embodiment for Separation

Figure 10A:
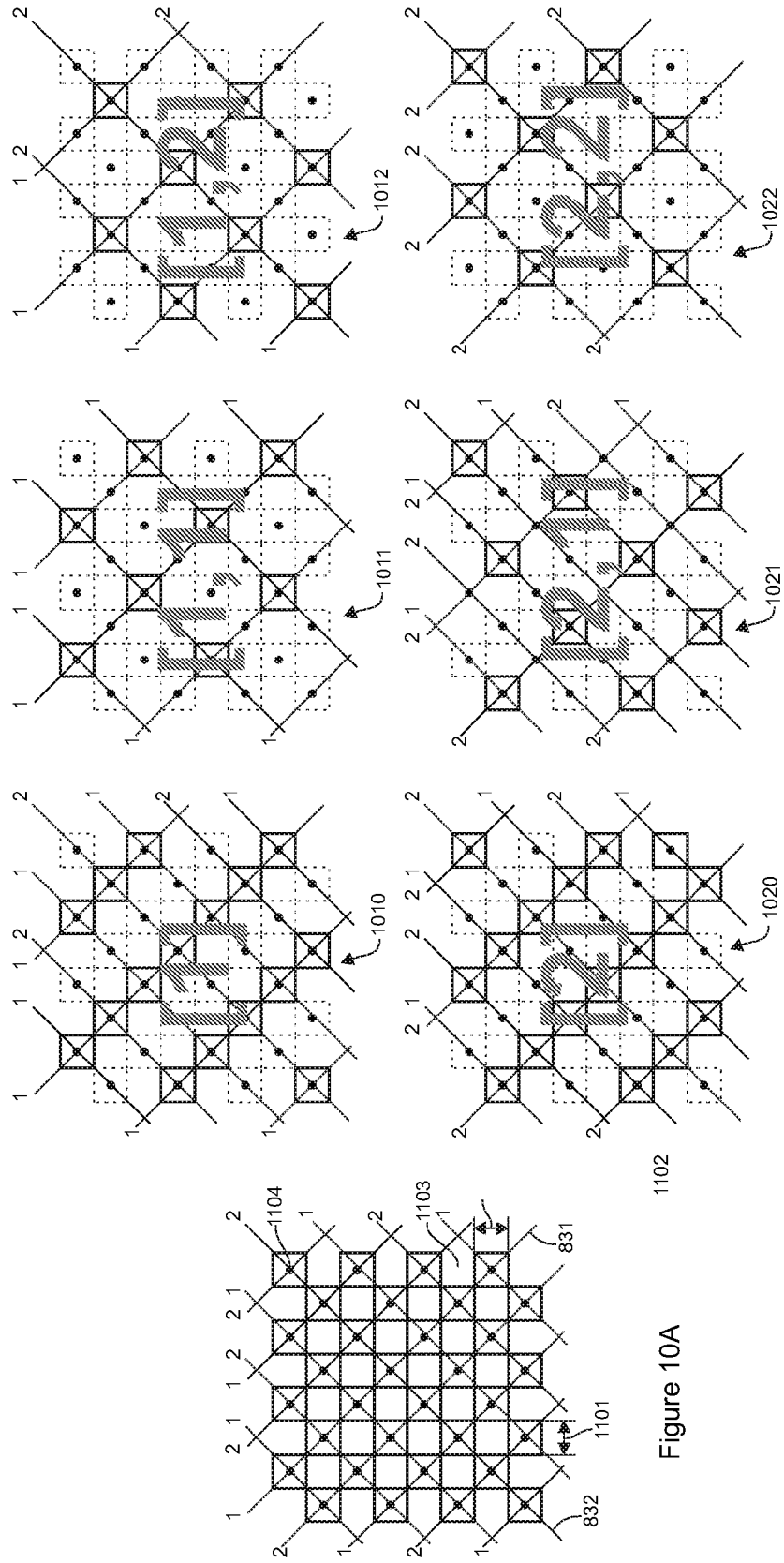

A preferred embodiment of the current invention is shown in FIGS. 10A-10C wherein M equals two and N equals two. The halftoned sub-sampled image is separated into four sub-images with indices [1,1], [1,2], [2,1] and [2,2].

Printing (According to First Preferred Embodiment)

According to a first possible preferred embodiment of the current invention, the order of the printing of the sub images is organized such that all the pixels 802 on any same line 1150 of the addressable grid belonging to a sub-image 1111, 1112, 1121, 1122, 1131, 1132 of the secondary set of sub-images are printed before the printing starts of pixels on the line 1150 of another sub-image of the secondary set.

What this comes down to is that pixels belonging to different sub-images are printed in separate passes of the print head. Since the pixels belonging to the same mutual interstitial sub-images do not touch (except when N=1), the occurrence of coalescence during the printing of the individual sub-image can be avoided.

Also, since the pixels belonging to different sub-images are printed during subsequent passes of the print head assembly, time is available for curing the pixels belonging to a first sub-image, before pixels of a subsequent sub-image are printed. This also enables to reduce the risk of coalescence between droplets of pixels belonging to different sub-images.

According to a preferred embodiment, a forced intermediate curing step by an energy source is performed between the printing of sub-images to further suppress ink coalescence between droplets of pixels belonging to different sub-images. Intermediate curing shall mean the curing of a sub-image just after it has been printed.

If the curing between the printing of sub-images is only a partial curing followed by a final curing when all the sub-images have been printed, the occurrence of uneven gloss and texture can be avoided.

Referring to FIG. 7, when the print head assembly 700 moves relative to the substrate in the fast scan direction 770, 780 intermediate curing is achieved by powering a first curing source 750. When the print head assembly 700 moves relative to the substrate in the slow scan direction 790, 791 intermediate curing is achieved by powering a second curing source 760.

Curing (Printing According to First Preferred Embodiment)

According to a preferred embodiment, a forced intermediate curing step by an energy source is performed between the printing of sub-images to further suppress ink coalescence between droplets of pixels belonging to different sub-images. Intermediate curing shall mean the curing of a sub-image just after it has been printed.

If the curing between the printing of sub-images is only a partial curing followed by a final curing when all the sub-images have been printed, the occurrence of uneven gloss and texture can be avoided.

Referring to FIG. 7, when the print head assembly 700 moves relative to the substrate in a fast scan direction 780, intermediate curing is achieved by powering a first curing source 750. Optionally, a final curing of partially cured dots that were printed in a prior swath is achieved by powering a second curing source 760.

The arrangement shown in FIG. 7 enables to print one sub-image of each color during one pass of the print head assembly.

When the print head assembly 700 moves relative to the substrate in a fast scan direction 790, intermediate curing is achieved by powering a second curing source 760. Optionally, a final curing of partially cured dots that were printed in a prior swath is achieved by powering a second curing source 760.

Printing (According to the Second Preferred Embodiment)

FIG. 17 illustrates a second preferred embodiment of the current invention.

To simplify the explanation, the following explanation concentrates on the printing of the image using the print heads 1701, 1705 with cyan ink, although the printing of the image with print heads containing other inks is entirely analogous.

According to one aspect of the second preferred embodiment, the order of the printing of the sub-images is organized such that all the pixels on any same line of the addressable grid belonging to at least two sub-images 1011, 1012 of the secondary set of sub-images are printed before the printing starts of pixels on the line of another of at least two sub-images 1021, 1022 of the secondary set (see also FIG. 10C).

What this comes down to is that pixels on a line belonging to two or more different sub-images 1021, 1022 are printed in one single pass, but by different print heads 1701, 1705. Preferably, the sub-images belonging to the secondary set of sub-images printed in the single pass are derived from the same sub-image belonging to the primary set of sub-images. For example, the sub-images 1011, 1012 belonging to the secondary set of sub-images are derived from the same sub-image 1010 from the primary set of sub-images.

The arrangement shown in FIG. 17 enables to print two sub-images of each color during one pass of the print head assembly and therefore halves the number of passes that are required and therefore enables to achieve higher printing speeds.

A variation of the preferred embodiment shown in FIG. 17 is shown in FIG. 19. In this case, a group of staggered print heads 1901, 1911 that act and behave as one single print head replaces a single print head 1701. The increased number of nozzles of a group of staggered print heads enables to print at faster speeds.

Curing (Printing According to Second Preferred Embodiment)

When the print head assembly 1700 moves relative to the substrate in a fast scan direction 1770, intermediate curing of dots printed by at least one head 1705-1708 is achieved by powering a first curing source 1751 and intermediate curing of dots printed by at least one head 1701-1704 is achieved by powering a second curing source 1750. Optionally, a final curing of partially cured dots that were printed in a prior swath is achieved by powering a third curing source 1752.

When the print head assembly 1700 moves relative to the substrate in a fast scan direction 1780, intermediate curing of dots printed by at least one head 1701-1704 is achieved by powering the second curing source 1751 and intermediate curing of dots printed by at least one head 1705-1708 is achieved by powering the third curing source 1752. Optionally, a final curing of partially cured dots that were printed in a prior swath is achieved by powering the first curing source 1750.

By using this arrangement of three curing sources 1750-1752 in combination with two sets of print heads 1701-1704, 1705-1708 coalescence of pixels belonging to different sub-images is effectively suppressed in combination with increased printing speed.

Controlling the Slow Scan Print Head Movement (First Preferred Embodiment)

Figure 12:
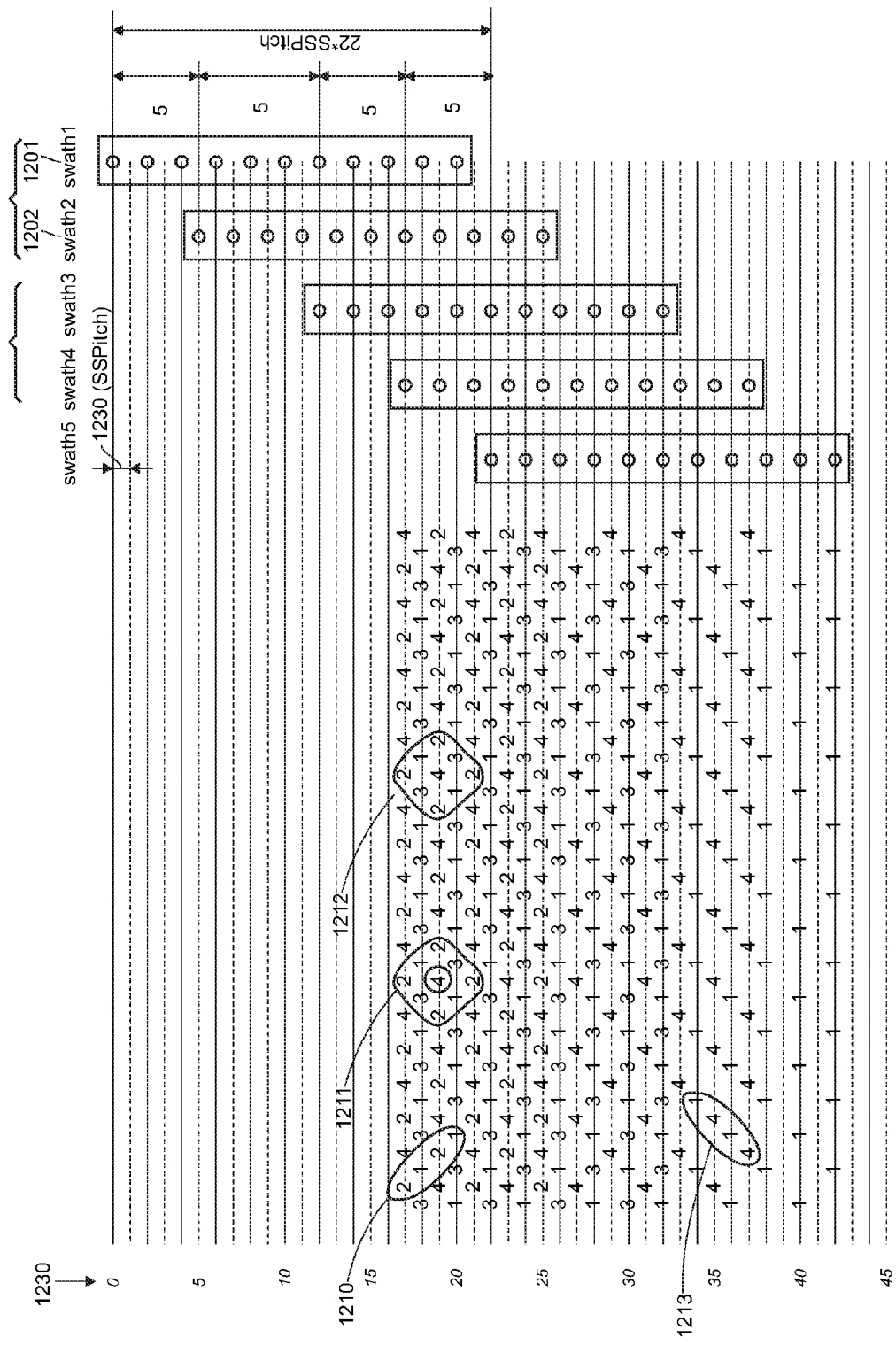
FIG. 12 shows a first preferred embodiment of the current invention that demonstrates the order in which four sub-images can be printed in different swaths.

FIG. 12 demonstrates a preferred method to implement the first preferred embodiment. The case that is shown corresponds with N=M=2 as in FIGS. 10A-10C. In order to save space on the drawing and with reference to FIGS. 11A-11C, the pixels belonging to the different sub-images are indicated as follows:

pixels belonging to sub-image [1,1] are indicated with 1;
pixels belonging to sub-image [1,2] are indicated with 2;
pixels belonging to sub-image [2,1] are indicated with 3;
pixels belonging to sub-image [2,2] are indicated with 4;

In general, a unique relation between a linear ordering scheme (1<=k, <=N*M) of N*Msub-images and a two-dimensional indexing system [i,j] is easily achieved as:

$$k=(i-1)*N+(j-1) \text{ with } 1<=i<=N; 1<=j<=M;$$

For reasons of simplicity, only one print head is shown having one column with 11 nozzles. It is assumed that the slow scan pitch is half the nozzle pitch, i.e., an interlacing factor slowScanInterlacingFactor of two is used to double the resolution of the printing compared with the native resolution of the print head. To indicate the position headPosition of the print head in the slow scan direction, the position of the first nozzle (upper nozzle on FIG. 12) is used on a scale 1230 expressed in the number of slow scan pitches.

The printing process preferably works according to the following steps.

In a step 1, the position headPosition of the print head is set at 0 and a first swath is printed that prints sub-image [1,1].

In a step 2, the position headPosition of the print head is incremented by a value slowScanStep1=5 so that it becomes equal to 5, and a second swath is printed that prints sub-image [1,2]. In the overlapping zone between the two swaths, a first diagonal pattern 1210 originates.

In a step 3, the position headPosition of the print head is incremented by a value slowScanStep2=7 so that it becomes equal to 12, and a third swath is printed that prints sub-image [2,1]. In the overlapping zone between the three swaths a rhombus like pattern 1211 originates consisting of "missing pixels" of sub-image [2,2] (indicated by the circle around "4" surrounded by printed pixels from sub-images [1,1], [1,2] and [2,1]).

In a step 4, the position headPosition of the print head is incremented by a value slowScanStep3=5 so that it becomes equal to 17, and a fourth swath is printed that prints sub-image [2,2]. In the overlapping zone between the four previous swaths all the pixels 1212 of the sub-images have now been printed.

In a step 5, the position headPosition of the print head is incremented by a value slowScanStep4=5 so that it becomes equal to 22 which corresponds exactly with the length of the print head plus one nozzle pitch, and a fifth swath is printed that prints continuous with printing sub-image [1,1]. In the overlapping zone between swath 4 and swath 5, a second diagonal pattern 1213 originates between pixels belonging to sub-image [1,1] and sub-image [2,2]. From here on, the steps 2, 3 and 4 are repeated until the complete image is printed. According to a preferred embodiment, the swaths 1 and 3 are printed along a first fast scan orientation and the swaths 2 and 4 along the opposite fast scan orientation.

In general the principles according to FIG. 12 can be generalized as follows:

If M*N=P is the number of sub-images and the slow scan interlacing factor is equal to SSIF than define slow scan steps SSS[1], SSS[2], . . . SSS[P] so that:

$$SSS[1]=a[1]*SSIF+1;$$

$$SSS[2]=a[2]*SSIF+1;$$

. . .

$$SSS[P]=a[P]*SSIF+1;$$

in which: a[1], a[2], . . . a[P] are integer values
so that: SSS[1]+SSS[2]+SSS[P]=headLength+SSIF;
and optionally so that: SSS[1]<headLength; SSS[2]<headLength; . . . SSS[P]<headLength.

Next, initialize the position of the head along the slow scan orientation.

And next again, perform a sequence (i=1, i<=P) including the steps of printing a sub-image and next moving the print head over a distance SSS[i]*slowScanPitch.

Repeat the above sequence until the complete image is printed.

Referring to FIG. 11C, it is noted that in every sub-image 1111, 1112, 1121, 1122, 1131, and 1132 only one out of two columns contains a pixel that has to be printed. This makes it possible to increase the velocity of the print head by a factor of two for the same firing frequency of the print head. In general, the velocity of the print head can be increased by a factor M when printing sub-images of the secondary series of sub-images. Consequently, the overall performance of the printing system does not have to decrease as a result of reconstructing the images from sub-images.

Controlling the Slow Scan Print Head Movement (Second Preferred Embodiment)

A problem may arise when using the method according to the previous preferred embodiment. Referring to FIG. 12, the orientation of the diagonal lines 1210 and 1213 may alternate during the printing and this may sometimes give rise to a form of banding that is correlated with the orientation of the diagonal lines.

This problem can be effectively addressed by imposing additional constraints to the values SSS[i] of the slow scan step. More specifically, if these values are selected such that all the sub-images that are derived from the same primary set of sub-images are printed first, it was surprisingly found that the orientation of the diagonals does not switch.

Specifically, banding can be avoided by requiring that on any group of N consecutive lines of the addressable printer grid all the pixels belonging to a sub-image of the primary set of sub-images are printed before the printing starts of pixels belonging to another sub-image of the primary set.

Figure 13:
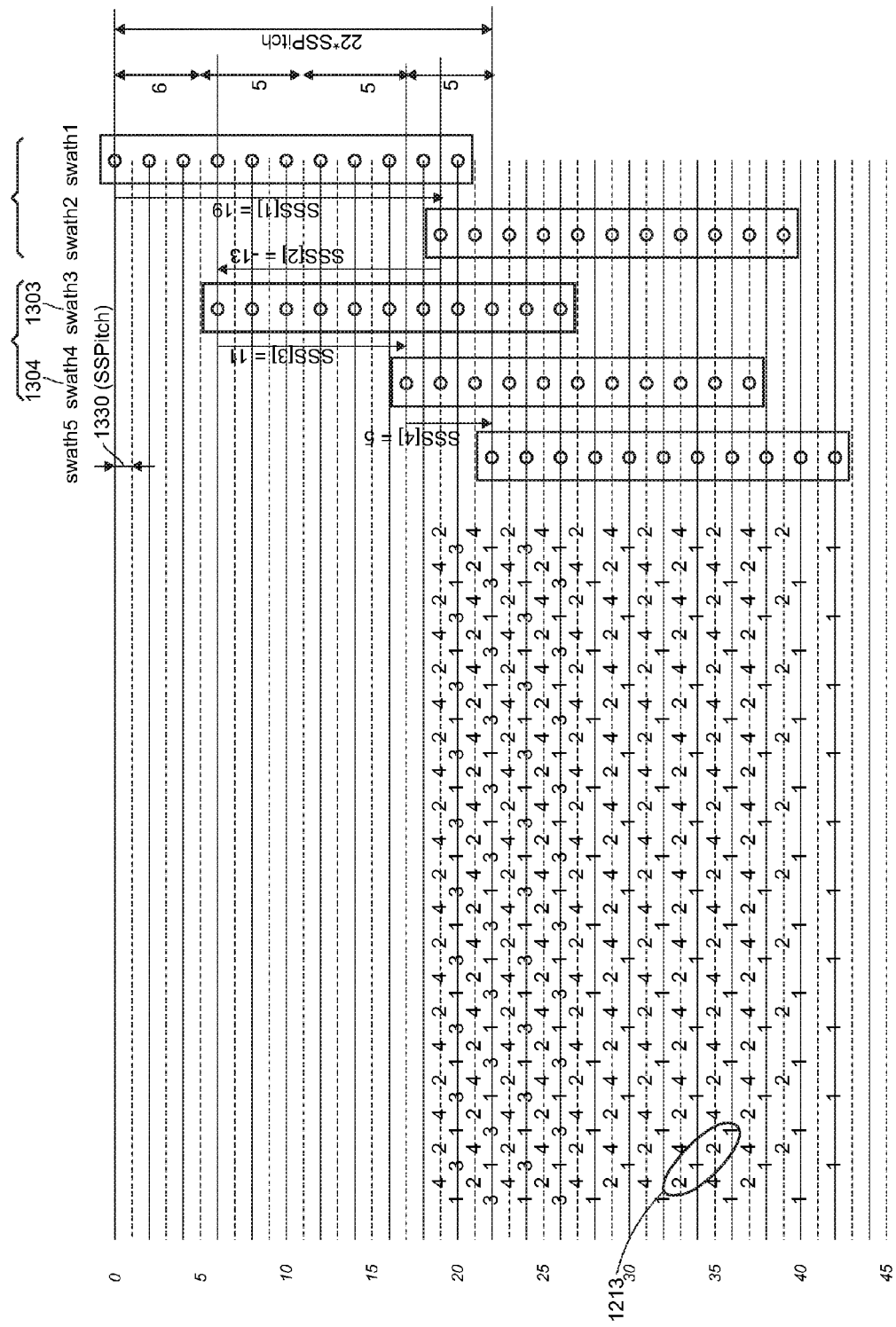
FIG. 13 shows a second preferred embodiment of the current invention that demonstrates the order in which four sub-images can be printed in different swaths.

This is demonstrated by an example in FIG. 13 and with reference to FIGS. 10A-10C. In this example, the values of SSS[i] have been selected in a way that on any two consecutive lines all the pixels of the sub-images 1011 and 1012 that are derived from a first sub-image 1010 in a primary set are printed before the printing starts of pixels belonging to the sub-images 1021 and 1022, that are derived from a second sub-image 1020 in the primary set.

The above requirement is fulfilled by requiring that the "domain" of the swaths 1303, 1304 that print sub-images 1021, 1022 derived from a first sub-image 1020 is a subset of the domain of the swaths 1201, 1202 that print sub-images 1011, 1012 derived from a second sub-image 1010 of the primary set. With "domain" of swaths is meant the set of lines that are located on or between the lines having the lowest and the highest slow scan index of the swaths.

Figure 14:
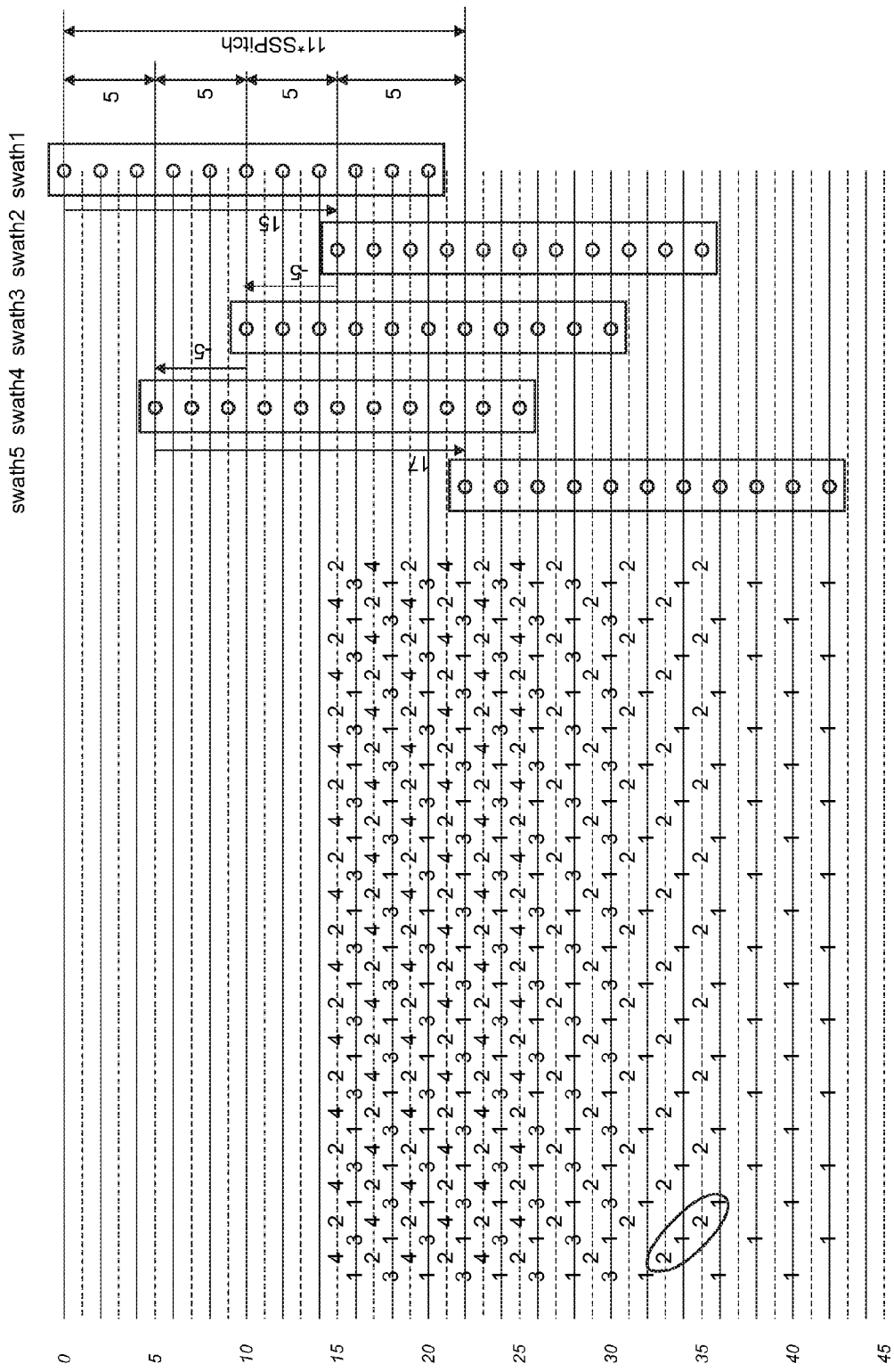
FIG. 14 shows a preferred embodiment of the current invention that demonstrates the order in which four sub-images can be printed in different swaths.
Figure 15B:
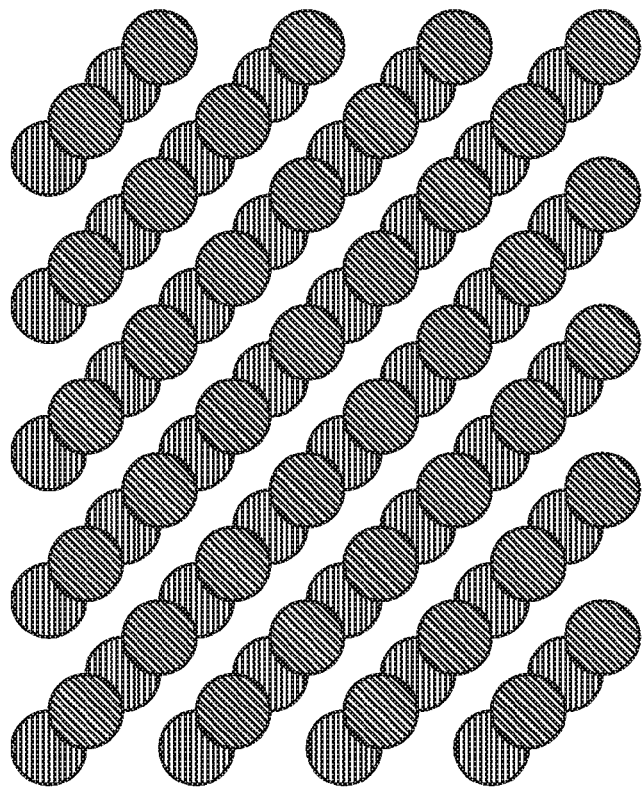
FIGS. 15A to 15D show dot patterns that are obtained by the subsequent printing of four sub-images according to a preferred embodiment of the current invention.
Figure 15A:
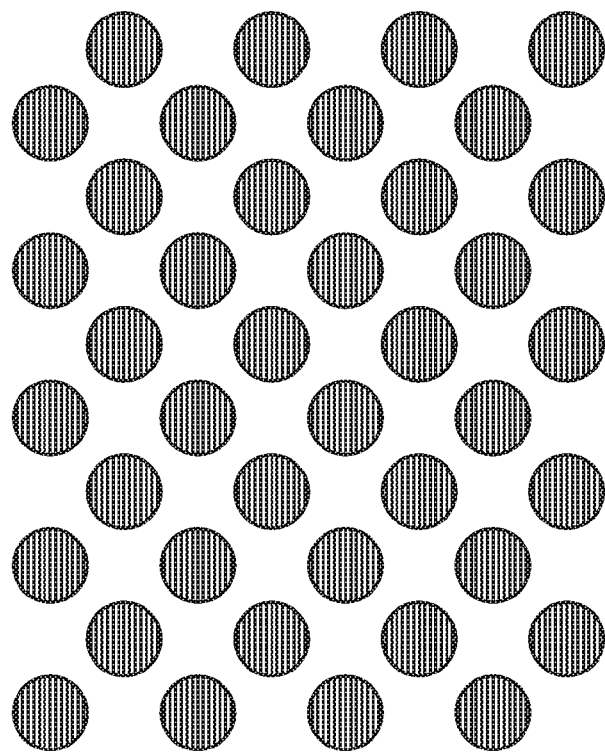
Figure 15D:
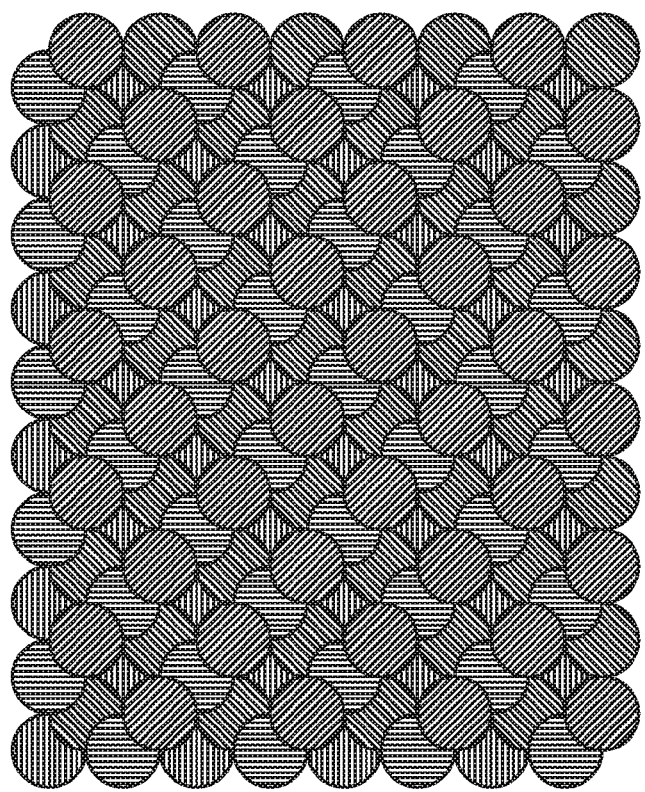
Figure 15C:
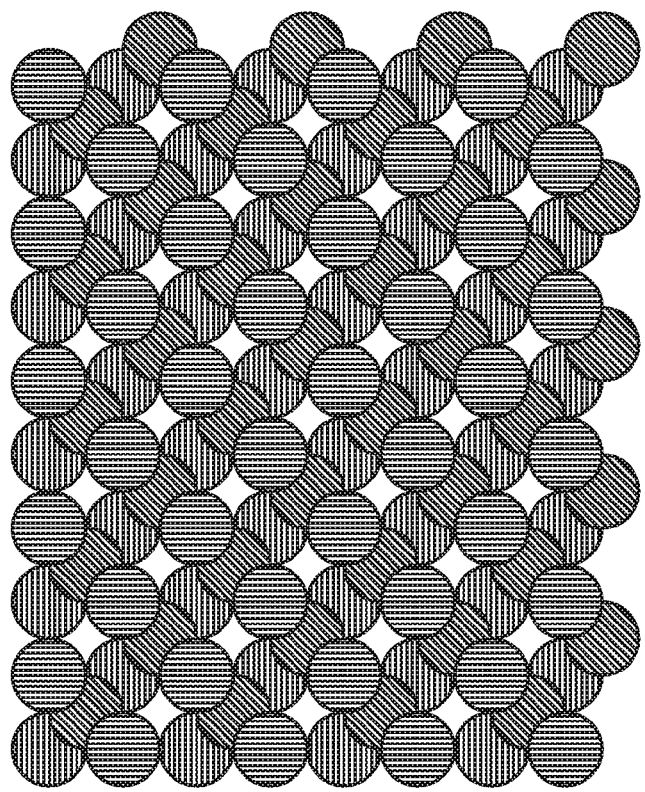
Figure 16B:
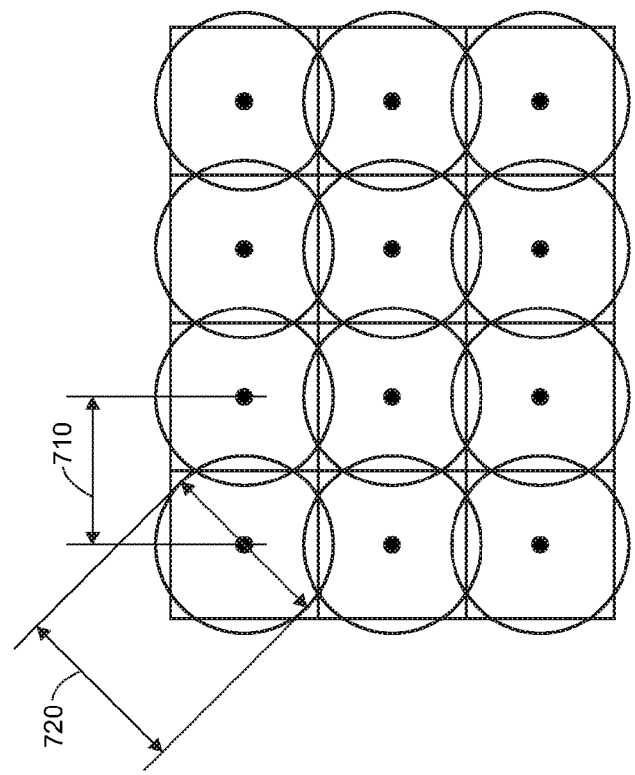
FIGS. 16A and 16B show that a minimum dot size is needed in relation to the pitch of an addressable printer grid to achieve complete coverage of a printed substrate.
Figure 16A:
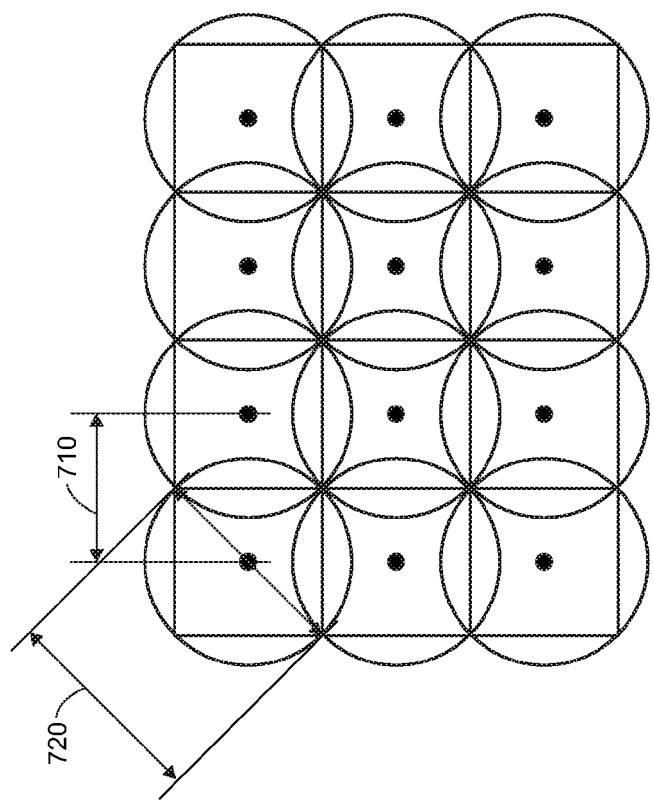

Mathematically the above requirement translates into requiring that:

SSS[3]<=−SSS[2]<SSS[1];

According to one preferred embodiment shown in FIG. 14, the slow scan movements SS[2] and SS[3] are identical and equal to headLength/4.

SSS[1]=3*headLength/4;

SSS[2]=SSS[3]=−headLength/4;

Because:

SSS[1]+SSS[2]+SSS[3]+SSS[4]=headLength+SSIF

The value of SSS[4] equals:

SSS[4]=headLength+SSIF+2*headLength/4−3*head-Length/4

SSS[4]=3*headLength/4+SSIF

Printing (According to a Third Preferred Embodiment)

An additional complication originates when an arrangement is used as shown in FIG. 18, because of the gap 1821 that originates during the printing of a swath.

According to another preferred embodiment of the current invention, this problem is resolved by including after each slow scan step according to one of the prior preferred embodiments an additional slow scan step ASSS.

Figure 20:
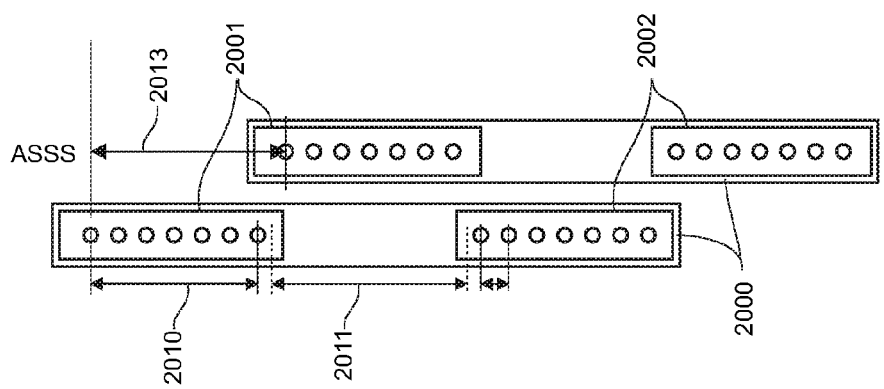
FIG. 20 shows a first preferred embodiment of an additional slow scan step.

FIG. 20 shows a case in which two heads 2001, 2002 together define a print head sub-assembly 2000.

The headLength 2010 is given by the following expression:

headLength=($nbr$Nozzles−1)*NozzlePitch;

In FIG. 20 the gapsize 2011 is equal to:

gapsize=$nbr$Nozzles*nozzlePitch;

Also in FIG. 20, the additional slow scan step 2013 is given by the expression:

ASSS=$nbr$Nozzles*nozzlePitch=gapsize;

Moving the print head assembly 2000 in an additional slow scan step over a distance 2013 enables to print those lines in the image that could not printed in a previous position of the print head, because they were in between the nozzles of the print head 2001 and the print head 2002.

Figure 21:
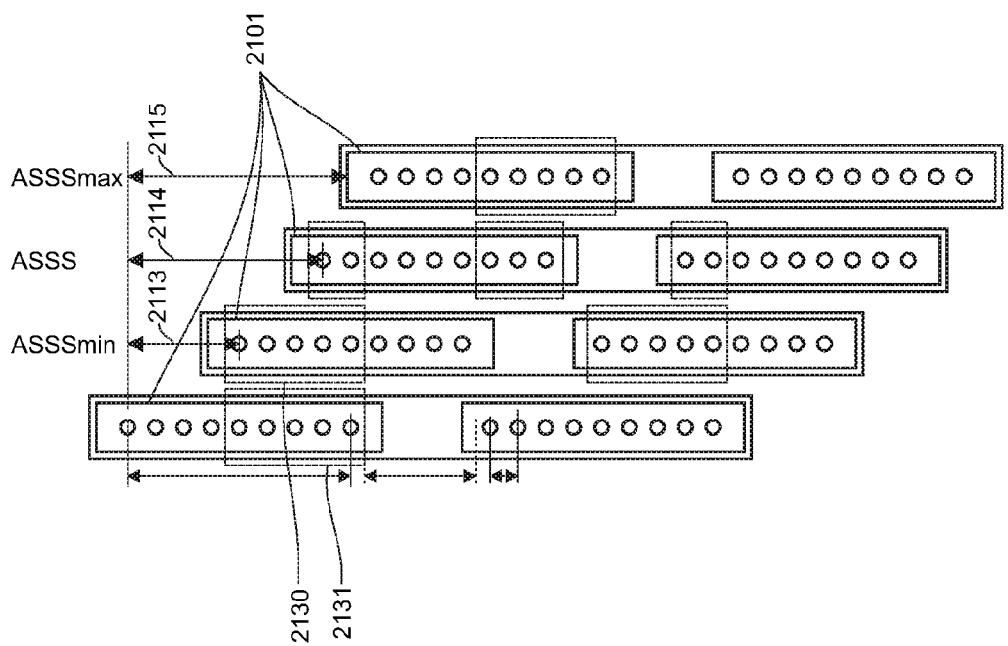
FIG. 21 shows a second preferred embodiment of an additional slow scan step.

FIG. 21 shows a case in which:

gapsize<$nbr$Nozzles*nozzlePitch;

The distance 2113 or 2114 or 2115 of an additional slow scan step ASSS is preferably constrained by:

gapsize=<ASSS=<$nbr$Nozzles+1

In a case like in FIG. 21, a nozzle redundancy problem originates, because certain lines can be printed by nozzles belonging to the print head both before and after the additional slow scan step. For example, the nozzles of print head 2101 surrounded by a dotted box 2130 in FIG. 21 print after the additional slow scan step over a distance 2113 on the same lines as the nozzles of the print head 2101 surrounded by a dotted box 2131 before the slow scan step over a distance 2113.

We introduce the concept of "common lines" to indicate lines that can be printed by (different) nozzles both before and after an additional slow scan step. The positions of these lines are called common line positions.

The nozzle redundancy problem can be solved in three ways as described below.

According to a first preferred method, the nozzles of a print head that correspond with common line positions are switched off when the print head is in a position before an additional slow scan step. The lines on the common line positions in that case are printed by nozzles after an additional slow scan step.

The second preferred method is essentially the complement of the first preferred method. According to the second preferred method, the nozzles of a print head that correspond with common line positions are switched off when the print head is in a position after an additional slow scan step. The lines on the common line positions in that case are printed by nozzles before an additional slow scan step.

According to a third preferred method, a pixel on a common line is alternately printed by a nozzle of a print head before and after an additional slow scan step. This third preferred method has the advantage that pixels on the same line are printed by two different nozzles and that image quality artifacts that are related with a specific nozzle are spatially diffused.

Abstraction

Many other preferred embodiments exist.

Specifically mentioned is the use of the above preferred embodiments in combination with monochrome printing or in combination with color printing such as printing with cyan, magenta, yellow, and black inks.

Specifically mentioned also is increasing the speed of the print assembly along the fast scan orientation by a factor of N when printing sub-images of a secondary set. Also specifically mentioned is bidirectional printing along the fast scan orientation.

FIG. 7 shows an arrangement for intermediate curing including two curing stations and FIG. 17 shows an arrangement for intermediate curing including three curing stations. According to the principles of the current invention even more curing stations may be used to print multiple sub-images during passes of the print head assembly.

Specifically mentioned is the use of the above preferred embodiments in combination with any slow scan interstitial factor greater than 1.

Specifically mentioned is any combination of separating an image into sub-images and printing the sub-images using any one of the printing methods above using any of the arrangements of print heads and optional curing sources.

Preferred embodiments of the current invention are preferably used for printing applications that are typically handled by a silk printing process, but are not limited to such applications.

In the above preferred embodiments, the addressable grid of the printer is a rectangular addressable grid of which only half the pixels are addressed. It should be clear to the person skilled in the art that this is equivalent to a printer that has a native addressable grid with pixels arranged in a checkerboard pattern.

Preferred embodiments of the present invention include the apparatus that uses any of the methods above and that has the technical features as set out above.

Preferred embodiments of the present invention include a computer program that performs the steps according the preferred embodiments above.

Also, specifically included is a printed substrate that is obtained using the methods according to the preferred embodiments of the current invention.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A method for reconstructing an image on a dot matrix printer having a print head assembly arranged to print a mutually interstitial sub-image during a print pass along a fast scan orientation, the method comprising:
    separating the image into a primary series of M (M>1) mutually interstitial sub-images;
    separating each one of the M mutually interstitial sub-images of the primary series into a secondary series of N (N>1) mutually interstitial sub-images to obtain N*M mutually interstitial sub-images of the secondary series;
    printing the N*M mutually interstitial sub-images of the secondary series; and
    performing at least a partial curing on the N*M mutually interstitial sub-images; wherein
    the printing and the at least partial curing of at least two of the N*M mutually interstitial sub-images of the secondary series that are derived from a same one of the M mutually interstitial sub-images of the primary series occurs during a same print pass of the print head assembly.

2. The method according to claim 1, wherein N=M=2.

3. The method according to claim 1, wherein a first sub-image belonging to the N*M mutually interstitial sub-images of the secondary series is printed along a first direction along the fast scan orientation, and another N*M mutually interstitial sub-image belonging to the secondary series is printed along a second direction opposite to the first direction along the fast scan orientation.

4. The method according to claim 1, further including a final curing step.

5. A dot matrix printing system for printing an image comprising:
    an image separator arranged to separate the image into a primary series of M (M>1) mutually interstitial sub-images;
    a second image separator arranged to separate each one of the M mutually interstitial sub-images of the primary series into a secondary series of N (N>1) mutually interstitial sub-images to obtain N*M mutually interstitial sub-images of the secondary series;
    a print head assembly arranged to print the N*M mutually interstitial sub-images during a print pass;
    a curing stations arranged to perform at least partial curing on the N*M mutually interstitial sub-images of the secondary series; and
    a sequencer arranged to control the print pass of the print head assembly and power supplied to the curing station; wherein
    the sequencer powers on the curing station during the print pass of the print head assembly to at least partially cure at least two of the N*M mutually interstitial sub-images of the secondary series that are derived from a same one of the M mutually interstitial sub-images of the primary series.

6. The system according to claim 5, wherein the dot matrix printing system is an inkjet printer.

7. The system according to claim 5, wherein the curing stations is a UV curing station.

8. A non-transitory computer readable medium comprising program code and computer code instructions adapted to carry out the method according to claim 1, when the instructions are executed on a computer.

* * * * *